US012671187B2

(12) United States Patent
Lee et al.

(10) Patent No.: US 12,671,187 B2
(45) Date of Patent: Jun. 30, 2026

(54) ANTENNA DEVICE

(71) Applicants: DENSO CORPORATION, Kariya-city (JP); TOYOTA JIDOSHA KABUSHIKI KAISHA, Toyota (JP); MIRISE Technologies Corporation, Nisshin (JP); TOKYO INSTITUTE OF TECHNOLOGY, Tokyo (JP)

(72) Inventors: Jungaun Lee, Nisshin (JP); Toshihiko Takahata, Nisshin (JP); Toshifumi Shirosaki, Nisshin (JP); Jiro Hirokawa, Meguro-ku (JP); Takashi Tomura, Meguro-ku (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP); TOKYO INSTITUTE OF TECHNOLOGY, Tokyo (JP)

( * ) Notice: Subject to any disclaimer, the term of this patent is extended or adjusted under 35 U.S.C. 154(b) by 141 days.

(21) Appl. No.: 18/661,936

(22) Filed: May 13, 2024

(65) Prior Publication Data

US 2025/0070474 A1 Feb. 27, 2025

(30) Foreign Application Priority Data

Aug. 23, 2023 (JP) ................................ 2023-135606

(51) Int. Cl.
*H01Q 13/26* (2006.01)
*H01Q 13/10* (2006.01)

(52) U.S. Cl.
CPC ............ *H01Q 13/26* (2013.01); *H01Q 13/10* (2013.01)

(58) Field of Classification Search
CPC ...... H01Q 13/26; H01Q 13/10; H01Q 21/005; H01Q 15/14; H01Q 19/10; H01P 1/00; H01P 3/12
See application file for complete search history.

(56) References Cited

U.S. PATENT DOCUMENTS

| | | | | |
|---|---|---|---|---|
| 10,224,617 | B2 | 3/2019 | Chen et al. | |
| 2017/0365931 | A1* | 12/2017 | Martel | H01Q 15/0086 |
| 2020/0303811 | A1* | 9/2020 | Saito | H01Q 1/288 |

FOREIGN PATENT DOCUMENTS

| | | | |
|---|---|---|---|
| WO | 2022/122319 | A1 | 6/2022 |

OTHER PUBLICATIONS

Chen, Rui-Sen et al. "Circularly-polarized cavity-backed slot antenna array with simplified feeding structure." International Journal of RF and Microwave Computer-Aided Engineering 31 (Year: 2021).*

(Continued)

*Primary Examiner* — Dimary S Lopez Cruz
*Assistant Examiner* — Austin M Back
(74) *Attorney, Agent, or Firm* — Posz Law Group, PLC

(57) ABSTRACT

An antenna device includes: a waveguide section to propagate radio waves; and a cavity section forming a cavity to communicate with the waveguide path via a power supply opening located on one side of the waveguide section in a first direction. The cavity section includes: a first wall having the power supply opening; a second wall opposing the first wall and having radiation apertures, and a side wall that connects the first wall and the second wall. The side wall has an inclined surface on one side and the other side of the power supply opening in a second direction perpendicular to the first direction such that a distance from the power supply opening in the second direction increases toward the one side in the first direction.

7 Claims, 27 Drawing Sheets

(56) References Cited

OTHER PUBLICATIONS

Mallahzadeh, Alireza & Hassani, H.R.. (2008). A novel dual-polarized double-ridged horn antenna for wideband applications. Progress in Electromagnetics Research (Year: 2008).*
Sasaki, K. et al., "Design of Waveguide Slot Subarray Antennas for Millimeter-wave Automotive Radar", The Institute of Electronics, Information and Communication Engineers (IEICE) General Conference, Mar. 7-10, 2023, B-1-73 (and English abstract).

* cited by examiner

ANTENNA DEVICE

CROSS REFERENCE TO RELATED APPLICATION

This application is based on Japanese Patent Application No. 2023-135606 filed on Aug. 23, 2023, the disclosure of which is incorporated herein by reference.

TECHNICAL FIELD

This disclosure relates to an antenna device.

BACKGROUND

When an antenna device has four radiation apertures, the propagation path of radio wave can be shaped like a tournament using a first branch and a second branch. The first branch branches the propagation path of radio wave into two paths, and the second branch branches the two paths into four paths.

SUMMARY

According to an aspect of the present disclosure, an antenna device includes: a waveguide section forming a waveguide path to propagate a radio wave; and a cavity section forming inside a cavity to communicate with the waveguide section via a power supply opening on one side of the waveguide section in a first direction. The cavity section includes: a first wall having the power supply opening and facing the cavity from the other side opposite to the one side in the first direction; a second wall opposing the first wall and having a plurality of radiation apertures to face the cavity from the one side in the first direction; and a side wall that connects the first wall and the second wall to surround the cavity between the first wall and the second wall. The radiation apertures communicate the cavity and an external space to propagate the radio waves between the cavity and the external space. The radiation apertures include at least three apertures arranged in a second direction perpendicular to the first direction. In a first cross section along the first direction and the second direction, the side wall has a second-direction changing surface on one side and the other side of the power supply opening in the second direction to face the cavity such that a distance from the power supply opening in the second direction increases toward the one side in the first direction. A shape of the second-direction changing surface is determined so that variations in phase of the radio waves at the radiation apertures are reduced when the radio waves of a predetermined wavelength are propagated from the power supply opening to the cavity, in comparison with a case where the second-direction changing surface is not provided in the first cross section such that the distance from the power supply opening to the side wall in the second direction is constant.

DETAILED DESCRIPTION

Figure 1:
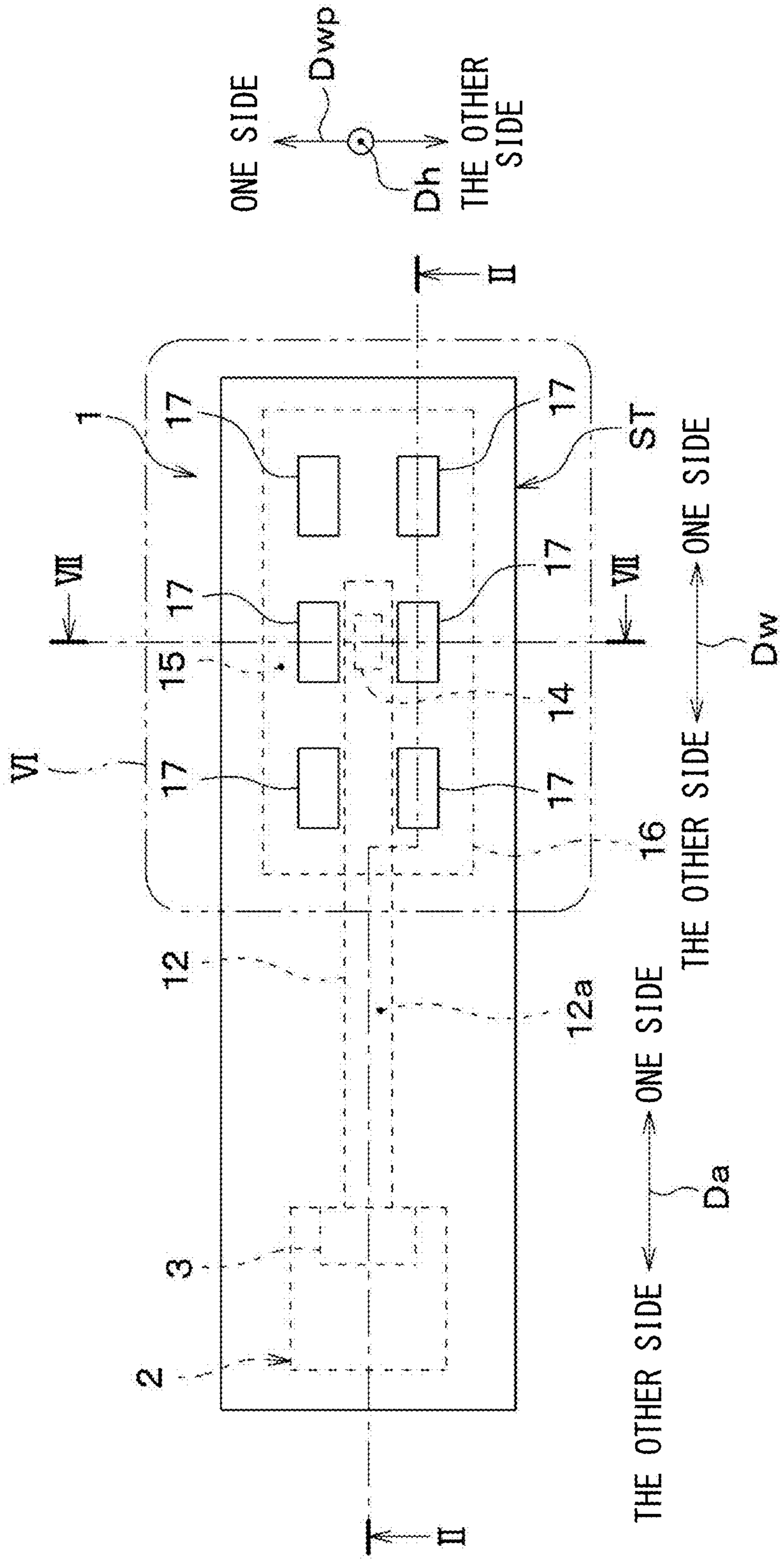
FIG. 1 is a schematic plan view showing an equipment including an antenna device according to a first embodiment.

When an antenna device has four radiation apertures, the propagation path of radio wave can be shaped like a tournament using a first branch and a second branch. The first branch branches the propagation path of radio wave into two paths, and the second branch branches the two paths into four paths.

When the propagation path is branched into a tournament shape, it is easy to align the phases of the radio waves at the four radiation apertures. However, when it is necessary to stack the first branch and the second branch, the size of the antenna device is increased. The above has been found as a result of detailed studies by the inventors.

The present disclosure provides an antenna device that facilitates aligning the phases of radio waves at a large number of radiation apertures while suppressing an increase in body size.

An antenna device according to one aspect of the present disclosure includes: a waveguide section forming a waveguide path to propagate radio waves; and a cavity section forming inside a cavity provided on one side in a first direction with respect to the waveguide section so as to communicate with the waveguide section via a power supply opening. The cavity section includes: a first wall that faces the cavity from the other side opposite to the one side in the first direction and having the power supply opening; a second wall opposing the first wall to face the cavity from the one side in the first direction, and having radiation apertures; and a side wall that connects the first wall and the second wall to face the cavity so as to surround the cavity between the first wall and the second wall. The radiation apertures communicate the cavity to an external space, so as to propagate radio waves between the cavity and the external space, and are arranged in three or more in a second direction perpendicular to the first direction. In a first cross section along the first direction and the second direction, the side wall has a second-direction changing surface on one side and the other side in the second direction with respect to the power supply opening to face the cavity such that a distance from the power supply opening in the second direction increases toward the one side in the first direction. The shape of the second-direction changing surface is determined so that variations in the phase of the radio wave at the plurality of radiation apertures is reduced when the radio waves of a predetermined wavelength is propagated from the power supply opening to the cavity, compared with a case where the second-direction changing surface is not provided in the first cross section so that the distance in the second direction from the power supply opening to the side wall is constant regardless of the position in the first direction.

In this way, the path length through which radio waves propagate between each of the radiation apertures and the power supply opening, and the reflection configuration of the radio waves are adjusted by setting the shape of the second-direction changing surface. Therefore, while three or more radiation apertures are arranged side by side in the second direction, there is an advantage that the phases of the radio waves at the radiation apertures can be easily aligned with each other.

Since a single cavity distributes radio waves to three or more radiation apertures, it is possible to suppress the increase in the size of the antenna device in the first direction, compared with a conventional structure in which the propagation path of radio wave is branched into a tournament shape.

Therefore, according to the antenna device, it is easy to align the phases of radio waves at a large number of radiation apertures arranged in three or more in the second direction while suppressing the increase in the size of the antenna device.

Hereinafter, embodiments are described with reference to the drawings. In the following embodiments, the same or equivalent parts are denoted by the same reference numerals in the drawings.

First Embodiment

Figure 2:
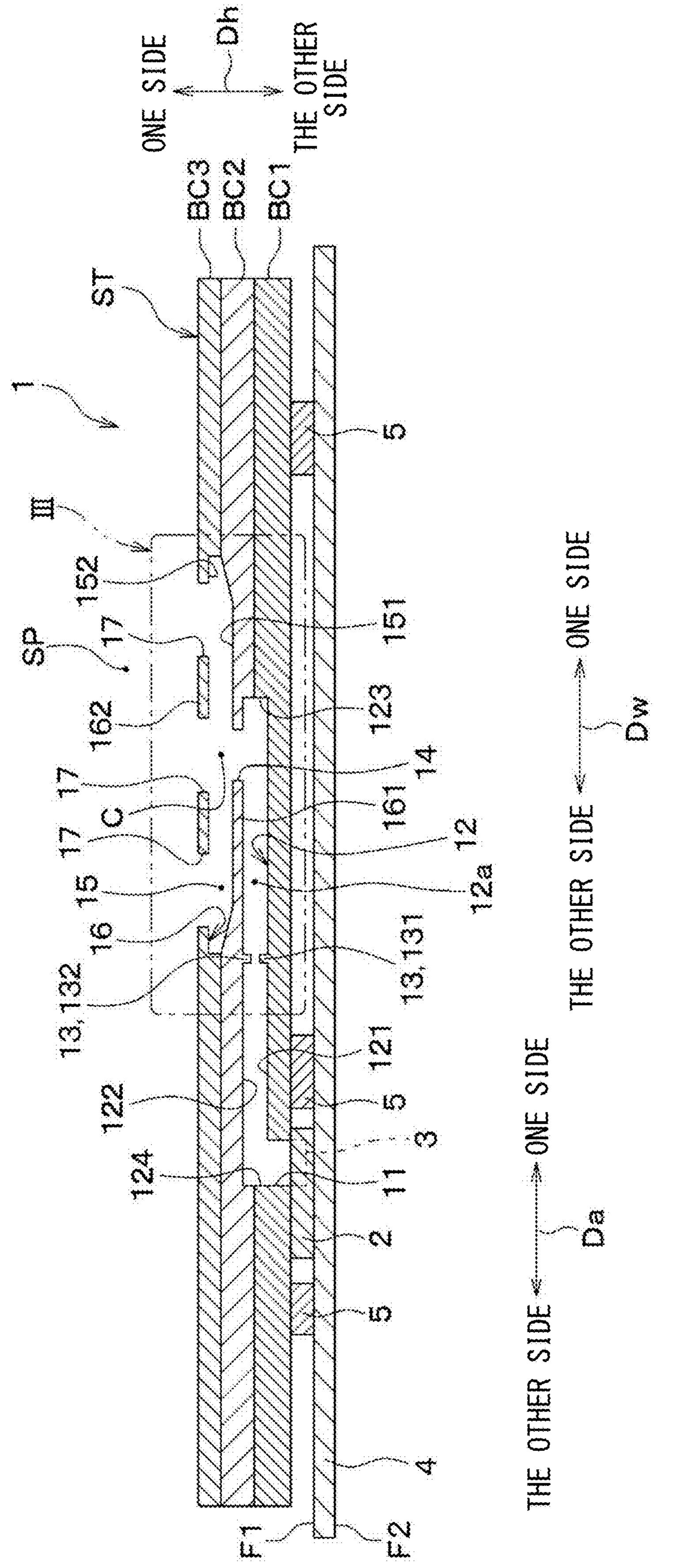
FIG. 2 is a cross-sectional view taken along line II-II in FIG. 1.

In this embodiment, as shown in FIGS. 1 and 2, an antenna device 1 of the present disclosure is applied to an equipment including a monolithic microwave integrated circuit (MMIC) 2 that is an electrical component.

In the description of this embodiment, a height direction Dh, a width direction Dw, and a lateral direction Dwp shown in FIGS. 1 and 2 may be used to represent the orientations in the antenna device 1. The height direction Dh, the width direction Dw, and the lateral direction Dwp intersect with each other, for example, perpendicular to each other. Further, in the present embodiment, the height direction Dh corresponds to a first direction of the present disclosure, the width direction Dw corresponds to a second direction of the present disclosure, and the lateral direction Dwp corresponds to a third direction of the present disclosure.

The MMIC 2 is a semiconductor device including an input/output section 3 that transmits and receives radio waves. The MMIC 2 is a transmitting/receiving device provided corresponding to the antenna device 1. In this embodiment, the operating frequency of radio waves transmitted and received by the MMIC 2 is a frequency band corresponding to millimeter waves. The operating frequency of the radio waves transmitted and received by the MMIC 2 is not limited to a frequency corresponding to millimeter waves, and may be a frequency other than millimeter waves.

The electric board 4 is a printed circuit board on which wiring patterns are formed using a conductive member such as metal foil. The thickness direction of the electric board 4 corresponds to the height direction Dh. The electric board 4 has one surface F1 formed on one side in the height direction Dh, and the other surface F2 formed on the other side in the height direction Dh. The MMIC 2 is mounted on the one surface F1 of the electric board 4.

In addition to the MMIC 2, plural spacers 5 are arranged on the one surface F1 of the electric board 4. The spacer 5 is made of, for example, a conductive material. The spacer 5 is fixed on the electric board 4.

The antenna device 1 is arranged on the one surface F1 of the electric board 4 with the MMIC 2 and the spacers 5 interposed therebetween. The antenna device 1 is fixed to the electric board 4 by screwing, adhesive, and the like, in contact with each of the MMIC 2 and the spacers 5.

Figure 3:
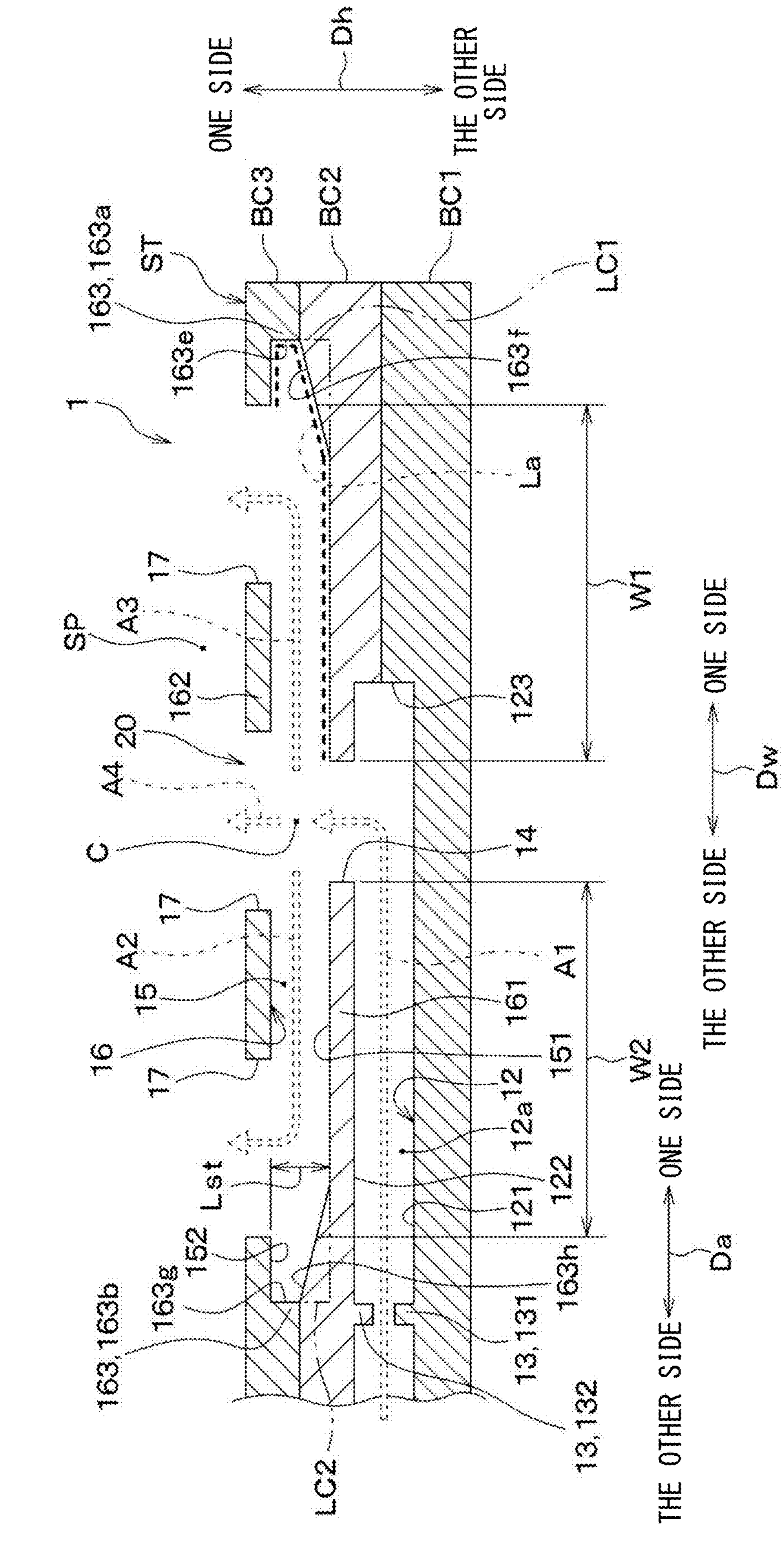
FIG. 3 is an enlarged view of a portion III in FIG. 2.

The antenna device 1 includes an antenna that transmits radio waves transmitted and received by the MMIC 2. As shown in FIGS. 2 and 3, the antenna device 1 is a structure ST having a stacked structure in which three conductive blocks BC1, BC2, and BC3 are stacked in the height direction Dh. The three blocks BC1, BC2, and BC3 are made of metal blocks.

At least one of the three blocks BC1, BC2, and BC3 may not be a metal block, but is, for example, a resin block with a conductive film such as a metal film formed on the surface by plating or the like. The block may be made of a conductive material other than metal.

Although the line II-II for defining the cross-section in FIG. 1 does not pass through the power supply opening 14, the power supply opening 14 is shown in FIG. 2 for easier viewing. Such a method of illustrating a cross-sectional view is similarly adopted in FIG. 3 and later-described cross-sectional views similar to FIG. 3.

The antenna device 1 has the three blocks BC1, BC2, BC3 connected to each other by screws, adhesives, and the like. The antenna device 1 is fixed to the electric board 4 in such a manner that the height direction Dh matches the thickness direction of the electric board 4.

Specifically, the three blocks BC1, BC2, and BC3 that constitute the antenna device 1 include the first block BC1, the second block BC2, and the third block BC3. The first block BC1, the second block BC2, and the third block BC3 are stacked in the order of the first block BC1, the second block BC2, and the third block BC3 from the side closer to the electric board 4, that is, from the other side in the height direction Dh.

The three blocks BC1, BC2, and BC3 have the same rectangular shape when viewed from the upper side along the height direction Dh. Furthermore, the three blocks BC1, BC2, and BC3 have approximately the same size in the plan view so as to overlap each other in the height direction Dh.

The surfaces of the first block BC1 and the second block BC2 that face each other are partially in contact with each other. Furthermore, the second block BC2 and the third block BC3 opposing each other are partially in contact with each other. Thereby, the three blocks BC1, BC2, and BC3 are electrically connected.

The other surface of the first block BC1 in the height direction Dh faces the one surface F1 of the electric board 4 with the MMIC 2 and the spacers 5 interposed therebetween. Although not shown, the first block BC1 is electrically connected to a ground pattern included in a wiring pattern formed on the one surface F1 of the electric board 4 via at least a portion of the spacers 5. Since the second block BC2 and the third block BC3 are electrically connected to the first block BC1, the second block BC2 and the third block BC3 are electrically connected to the ground pattern of the electric board 4 via the first block BC1. The ground pattern of the electric board 4 is set to a ground potential.

An external port 11 is formed in the first block BC1 so that radio waves can propagate between the first block BC1 and the MMIC 2. The external port 11 is formed at a position facing the input/output section 3 of the MMIC 2 in the first block BC1. This allows radio waves to propagate between the external port 11 and the MMIC 2.

A waveguide section 12 is formed in the first block BC1 and the second block BC2, which is a waveguide serving as a propagation path for radio waves. In this embodiment, since the external port 11 is open to the waveguide section 12, the entire waveguide section 12 serves as a waveguide. Therefore, a portion of the first block BC1 and the second block BC2 that forms the waveguide section 12 constitutes a waveguide.

The waveguide section 12 is formed by coupling a first groove portion 121 formed in the first block BC1 and a second groove portion 122 formed in the second block BC2 facing each other in the height direction Dh.

The first groove portion 121 is formed in the first block BC1 to face the second block BC2. The first groove portion 121 is configured as a bottomed groove recessed from one side to the other side in the height direction Dh. The external port 11 is formed on the bottom surface of the first groove portion 121.

The second groove portion 122 is formed in the second block BC2 to face the first groove portion 121 of the first block BC1. The second groove portion 122 is configured as a bottomed groove recessed from the other side to the one side in the height direction Dh. A power supply opening 14, which will be described later, is formed in the bottom surface of the second groove portion 122.

The waveguide section 12 has a waveguide path **12*a* formed inside the waveguide section 12 for propagating radio waves. The waveguide path 12*a* is a cavity formed by coupling the first groove portion 121 and the second groove portion 122**, and extends along the waveguide extending direction Da. In this embodiment, the waveguide extending direction Da corresponds to the width direction Dw. Moreover, one side in the waveguide extending direction Da is one side in the width direction Dw, and the other side in the waveguide extending direction Da is the other side in the width direction Dw.

Figure 4:
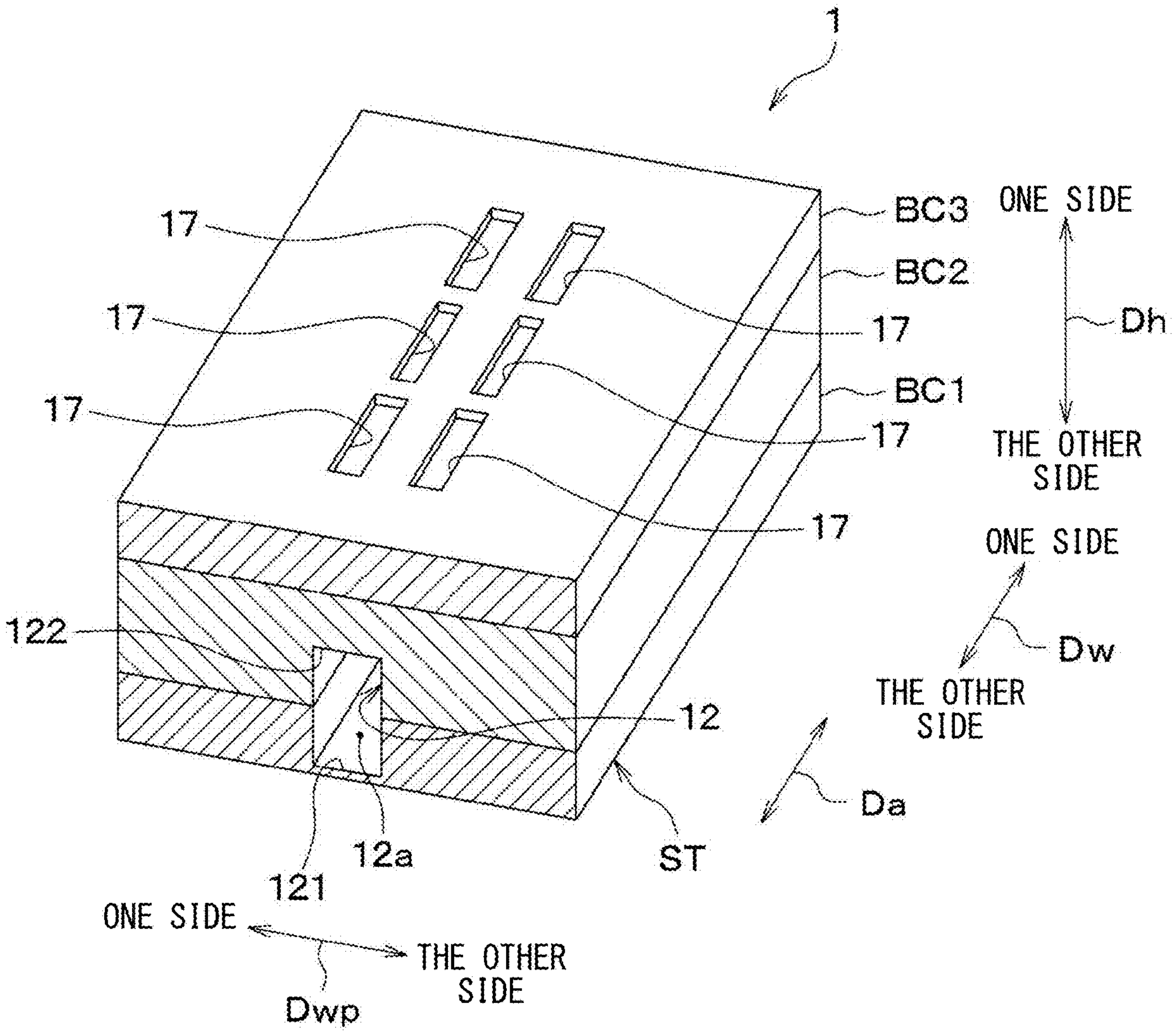
FIG. 4 is a schematic perspective view showing the antenna device of the first embodiment.
Figure 5:
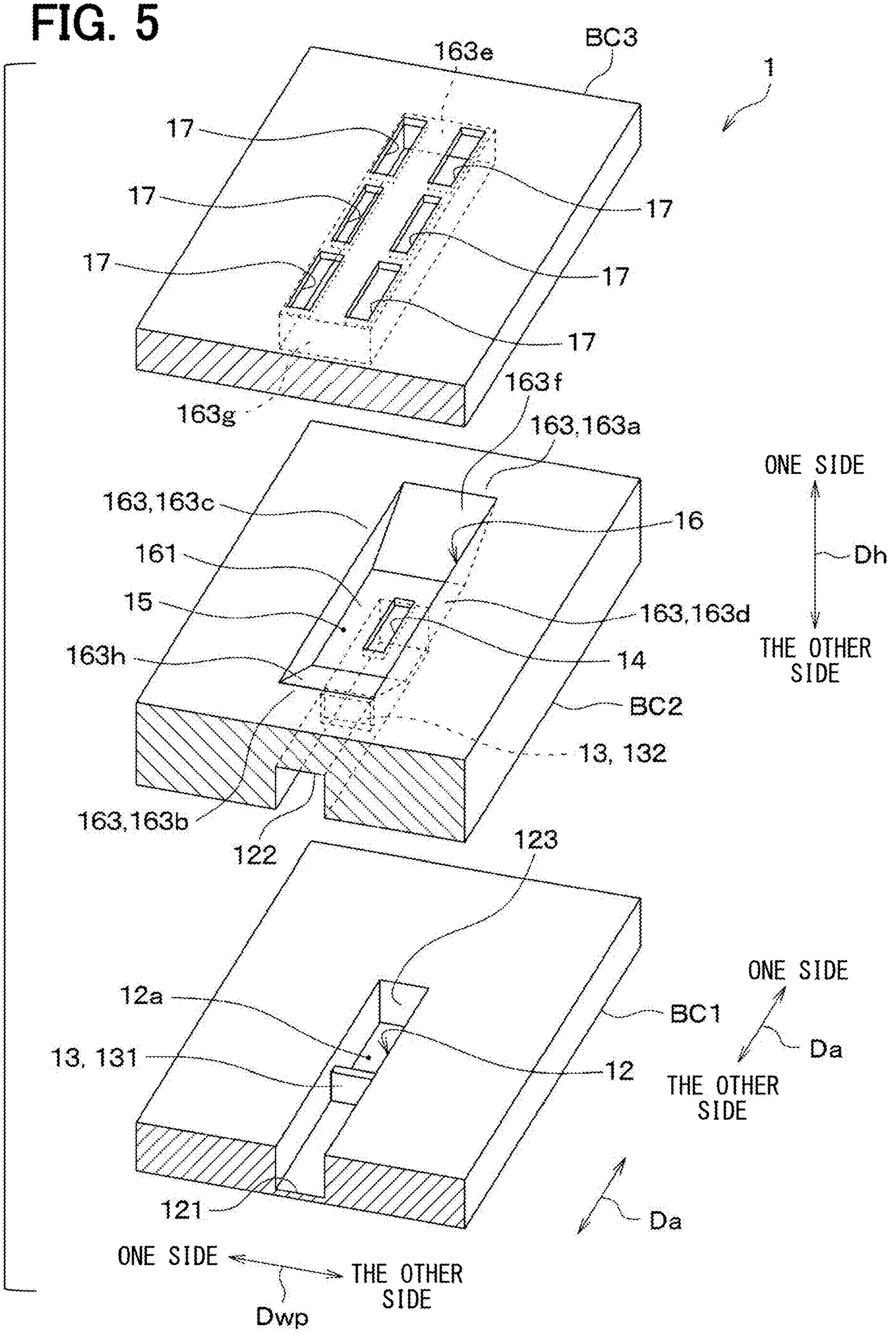
FIG. 5 is a schematic exploded perspective view showing the antenna device of the first embodiment.

As shown in FIGS. 4 and 5, a cross section of the waveguide path **12*a* perpendicular to the waveguide extending direction Da has a rectangular shape extending in the height direction Dh. That is, in the waveguide path 12*a***, the dimension in the height direction Dh is larger than the dimension in the lateral direction Dwp.

As shown in FIGS. 1 to 3, the waveguide path **12*a* extends from the vicinity of the external port 11 to the vicinity of the power supply opening 14. The waveguide section 12 has a first end wall 123 and a second end wall 124 forming the ends of the waveguide path 12*a* at both ends of the waveguide path 12*a* in the waveguide extending direction Da. Specifically, the first end wall 123 is provided at one end of the waveguide path 12*a* in the waveguide extending direction Da. Further, the second end wall 124 is provided at the other end of the waveguide path 12*a*** in the waveguide extending direction Da.

The second end wall 124 is constituted by a planar wall that extends in a direction perpendicular to the waveguide extending direction Da. The second end wall 124 is located near the external port 11. Specifically, the second end wall 124 is disposed on the other side in the waveguide extending direction Da with respect to the external port 11, and faces the waveguide path **12*a*** on one side in the waveguide extending direction Da.

The first end wall 123 is constituted by a planar wall that extends in a direction perpendicular to the waveguide extending direction Da. The first end wall 123 is provided as a short wall, and is arranged near the power supply opening 14. Specifically, the first end wall 123 is provided on one side in the waveguide extending direction Da with respect to the open position of the power supply opening 14 that opens to the waveguide path **12*a*, and faces the waveguide path 12*a*** on the other side in the waveguide extending direction Da.

The positional relationship between the power supply opening 14 and the first end wall 123 is set in consideration of the amount of coupling between the waveguide path **12*a* and the cavity 15. In other words, the antenna device 1 is configured to control the amount of coupling between the waveguide path 12***a* and the cavity 15, by the distance between the power supply opening 14 and the first end wall 123.

In the second block BC2, the power supply opening 14 is formed in the bottom surface of the second groove portion 122 forming the waveguide path 12*a*. The power supply opening 14 is a port through which radio waves are propagated between the waveguide path 12*a* and the cavity 15. The power supply opening 14 is formed as a through hole penetrating the second block BC2 in the height direction Dh between the waveguide path 12*a* and the cavity 15. The power supply opening 14 is formed in the second block BC2 at a position that does not overlap with the external port 11 in the height direction Dh.

The power supply opening 14 has a rectangular shape extending in the width direction Dw when viewed from the upper side. The shape of the power supply opening 14 is not rectangular, and may be, for example, an oval shape, a diamond shape, or the like.

The waveguide section 12 has a reflection suppressing wall 13 provided within the waveguide path 12*a* to suppress reflection of radio waves. The reflection suppressing wall 13 is provided at a position on the other side in the waveguide extending direction Da with respect to the open position of the power supply opening 14 relative to the waveguide path 12*a*.

The reflection suppressing wall 13 has a first protruding wall 131 and a second protruding wall 132 arranged in the waveguide path 12*a* apart from each other in the height direction Dh. The first protruding wall 131 is provided to protrude from the bottom surface of the first groove portion 121 toward one side in the height direction Dh. Further, the second protruding wall 132 is provided to protrude from the bottom surface of the second groove portion 122 toward the other side in the height direction Dh. The first protruding wall 131 and the second protruding wall 132 are provided in the waveguide path 12*a* so that their positions in the waveguide extending direction Da are the same. Further, the first protruding wall 131 and the second protruding wall 132 are configured to have substantially the same height, thickness, and shape. The first protruding wall 131 and the second protruding wall 132 are at a height so as not to come into contact with each other.

The position, height, thickness, and shape of each of the first protruding wall 131 and the second protruding wall 132 affect the impedance of the space between the first end wall 123 and the reflection suppressing wall 13 in the waveguide path 12*a*. Therefore, the position, height, thickness, and shape of the first protruding wall 131 and the second protruding wall 132 are determined such that the impedance of the cavity 15 matches the impedance of the space between the first end wall 123 and the reflection suppressing wall 13 in the waveguide path 12*a*.

A cavity section 16 is provided in the second block BC2 and the third block BC3 so as to extend over the second block BC2 and the third block BC3. The cavity 15 is formed inside the cavity section 16. The cavity 15 is formed between the second block BC2 and the third block BC3.

The cavity 15 is disposed adjacent to the waveguide path 12*a* on one side in the height direction Dh, and communicates with the waveguide path 12*a* via the power supply opening 14. For example, the cavity 15 has a flat shape that expands in the width direction Dw and the lateral direction Dwp. Further, the cavity 15 has a rectangular shape in a plan view. The longitudinal direction of the cavity 15 is the width direction Dw, and the lateral direction of the cavity 15 is the lateral direction Dwp. In this embodiment, a portion of the second block BC2 and the third block BC3 that forms the cavity 15 constitutes the cavity section 16.

The cavity section 16 includes a first wall 161 having the power supply opening 14 adjacent to the waveguide section 12, a second wall 162 facing the first wall 161 in the height direction Dh, and a side wall 163 connecting the first wall 161 and the second wall 162.

Figure 6:
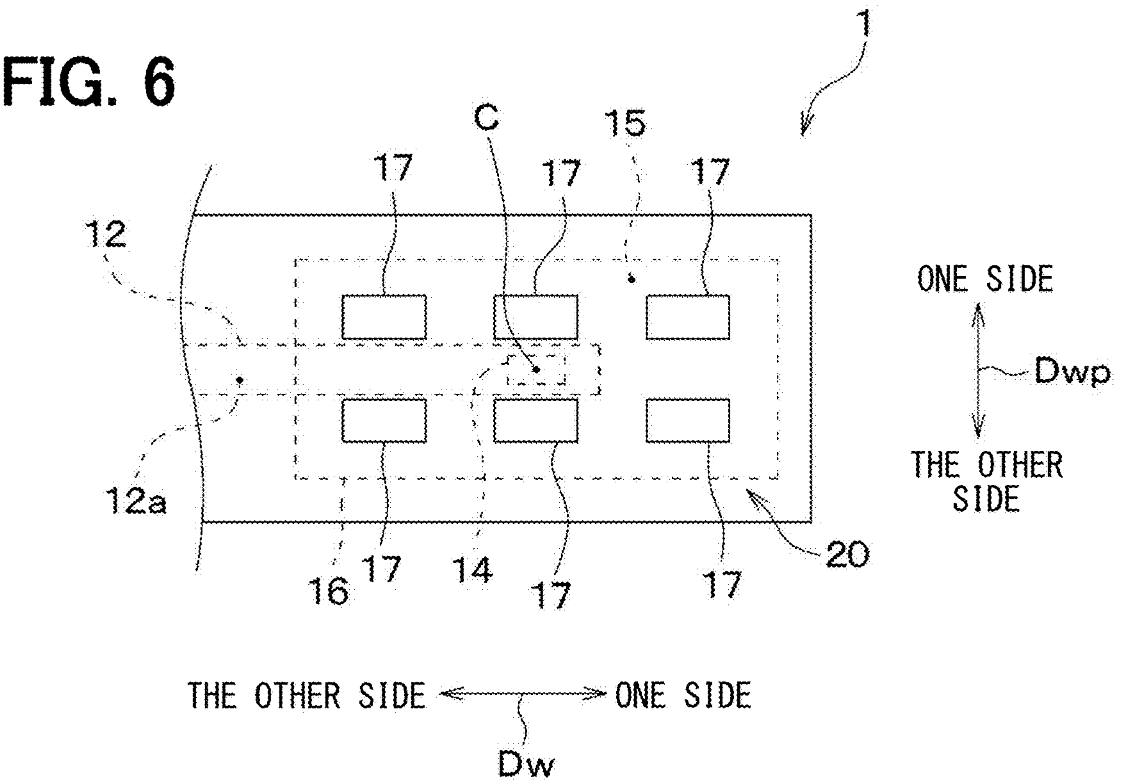
FIG. 6 is a view of a portion VI in FIG. 1.
Figure 7:
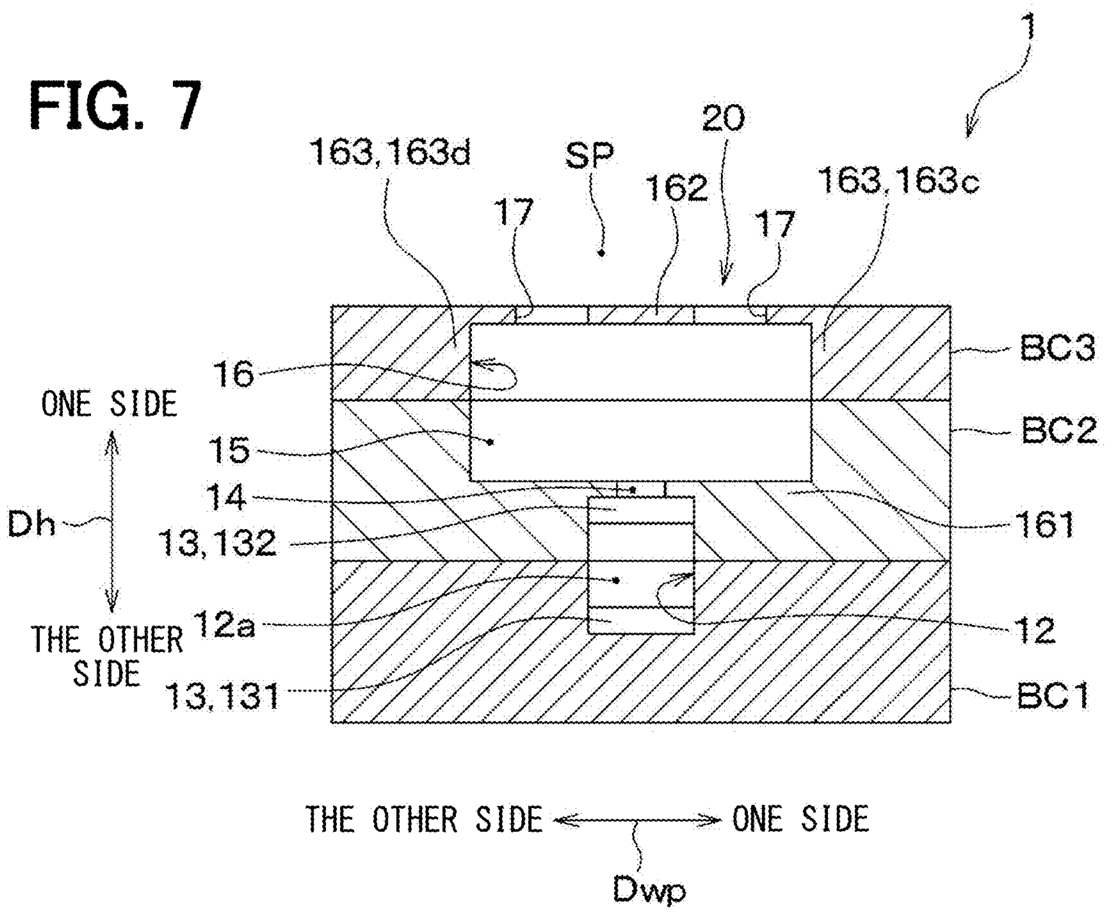
FIG. 7 is a cross-sectional view taken along line VII-VII in FIG. 1.

As shown in FIGS. 3, 6, and 7, the first wall 161 is disposed on the other side of the cavity 15 in the height direction Dh, and faces the cavity 15 from the other side in the height direction Dh. The second wall 162 is disposed on one side of the cavity 15 in the height direction Dh, and faces the cavity 15 from one side in the height direction Dh.

Each of the first wall 161 and the second wall 162 has a rectangular shape in the plan view. Specifically, each of the first wall 161 and the second wall 162 has a rectangular shape extending in the width direction Dw. Although the first wall 161 and the second wall 162 have the same size in the lateral direction Dwp, the first wall 161 is formed smaller than the second wall 162 in the width direction Dw. Specifically, in the width direction Dw, the first wall 161 is formed such that the entire width of the first wall 161 is inside the width of the second wall 162.

The side wall 163 is provided between the first wall 161 and the second wall 162 in the height direction Dh, and surrounds the cavity 15 between the first wall 161 and the second wall 162 so as to face the cavity 15. Specifically, the side wall 163 has four side walls that connect the four sides of the first wall 161 and the four sides of the second wall 162. The four side walls include a first side wall 163*a*, a second side wall 163*b*, a third side wall 163*c*, and a fourth side wall 163*d*.

The first side wall 163*a* is arranged on one side in the width direction Dw with respect to the cavity 15 and the power supply opening 14, and the second side wall 163*b* is arranged on the other side in the width direction Dw with respect to the cavity 15 and the power supply opening 14. That is, the first side wall 163*a* and the second side wall 163*b* are arranged opposite to each other in the width direction Dw with the cavity 15 in between. Therefore, the first side wall 163*a* and the second side wall 163*b* are represented in a first cross section (for example, the cross section in FIG. 3) along the height direction Dh and the width direction Dw.

The first side wall 163*a* and the second side wall 163*b* respectively have vertical wall surfaces 163*e* and 163*g* facing the cavity 15, and inclined wall surfaces 163*f* and 163*h* arranged on the other side in the height direction Dh, with respect to the vertical wall surfaces 163*e* and 163*g*, to face the cavity 15. In this embodiment, the inclined wall surface 163*f*, 163*h* corresponds to a second-direction changing surface of the present disclosure.

The inclined wall surface 163*f* of the first side wall 163*a* is provided between the vertical wall surface 163*e* of the first side wall 163*a* and the first wall 161, and connects the vertical wall surface 163*e* and the first wall 161. Further, the inclined wall surface 163*h* of the second side wall 163*b* is provided between the vertical wall surface 163*g* of the second side wall 163*b* and the first wall 161, and connects the vertical wall surface 163*g* and the first wall 161.

The vertical wall surface 163*e*, 163*g* of the first side wall 163*a* and the second side wall 163*b* is formed in a planar shape with the width direction Dw as the normal direction. The inclined wall surface 163*f*, 163*h* of the first side wall 163*a* and the second side wall 163*b* has a planar shape extending along the lateral direction Dwp, but inclined with respect to the height direction Dh.

Specifically, in a first cross section as shown in FIG. 3, for example, the inclined wall surface 163*f* of the first side wall 163*a* is formed such that the distance W1 in the width direction Dw from the power supply opening 14 to the inclined wall surface 163*f* becomes continuously larger toward the one side in the height direction Dh. Similarly, in the first cross section, the inclined wall surface 163*h* of the second side wall 163*b* is formed such that the distance W2 in the width direction Dw from the power supply opening 14 to the inclined wall surface 163*h* becomes continuously larger toward the one side in the height direction Dh.

In this embodiment, the inclined wall surfaces 163*f* and 163*h* are formed in the second block BC2, and the vertical wall surfaces 163*e* and 163*g* are formed in the third block BC3.

As shown in FIGS. 5 and 7, the third side wall 163*c* is disposed on one side in the lateral direction Dwp with respect to the cavity 15 and the power supply opening 14, and the fourth side wall 163*d* is disposed on the other side in the lateral direction Dwp with respect to the cavity 15 and the power supply opening 14. That is, the third side wall 163*c* and the fourth side wall 163*d* are arranged opposite to each other in the lateral direction Dwp with the cavity 15 in between. Further, the third side wall 163*c* and the fourth side wall 163*d* are not inclined with respect to the height direction Dh, and each forms a planar wall surface facing the cavity 15 with the lateral direction Dwp as the normal direction.

In the cavity 15 formed in this way, the dimension in the width direction Dw is larger than the dimension in the lateral direction Dwp and the dimension in the height direction Dh, as shown in FIGS. 3, 5, and 6. Further, the cavity 15 has a shape that is widened both on one side and the other side in the lateral direction Dwp with respect to the waveguide path 12*a*. That is, the dimension of the cavity 15 in the lateral direction Dwp is larger than the dimension of the waveguide path 12*a* in the lateral direction Dwp.

The cavity 15 of this embodiment is formed by coupling a first recess 151 and a second recess 152 respectively formed in the second block BC2 and the third block BC3 facing each other in the height direction Dh.

The first recess 151 is formed in a portion of the second block BC2 that faces the third block BC3. The first recess 151 is recessed from one side to the other side in the height direction Dh. The power supply opening 14 is formed in the first wall 161 that is the bottom surface of the first recess 151. This allows radio waves to propagate between the power supply opening 14 and the cavity 15.

The second recess 152 is formed in a portion of the third block BC3 that faces the second block BC2. The second recess 152 is recessed from the other side to the one side in the height direction Dh. Plural radiation apertures 17 forming antenna radiating elements are formed in the second wall 162 serving as the bottom surface of the second recess 152.

This allows radio waves to propagate between the power supply opening 14 and each of the radiation apertures 17 via the cavity 15. The cavity 15 of this embodiment functions as a branching section that distributes and propagates the radio waves from the power supply opening 14 to each of the radiation apertures 17.

The radiation apertures 17 are formed as through holes that penetrate the second wall 162 in the height direction Dh. Thereby, the cavity 15 communicates with the external space SP of the antenna device 1 via the radiation apertures 17. Radio waves can propagate between the cavity 15 and the external space SP via each of the radiation apertures 17. In other words, each of the radiation apertures 17 connects the cavity 15 and the external space SP, and propagates radio waves between the cavity 15 and the external space SP.

The radiation apertures 17 have the same shape, and have a rectangular shape extending in the width direction Dw in the plan view. For example, the dimension in the width direction Dw of the radiation aperture 17 is set to be from 0.5 times to about 1 times of the wavelength of the radio wave at the operating frequency. The wavelength of radio waves at the operating frequency is the wavelength of radio waves at a typical frequency included in the operating frequency, and can be interpreted as, for example, the wavelength of radio waves at the center frequency of the operating frequency.

As shown in FIG. 6, the radiation apertures 17 are arranged side by side at intervals in each of the width direction Dw and the lateral direction Dwp. Specifically, six radiation apertures 17 are provided, three of which are lined at equal intervals in the width direction Dw, and two of which are lined in the lateral direction Dwp. That is, the radiation apertures 17 are arranged in a 3×2 grid.

The antenna device 1 of this embodiment is configured so that the phases of the radio waves are aligned at the radiation apertures 17 so that the radio waves of a predetermined wavelength do not cancel each other out at the radiation apertures 17. The configuration for realizing this will be described below. It is preferable that the predetermined wavelength is the same as the wavelength of the radio wave at the operating frequency.

In this embodiment, as shown in FIG. 3, since three radiation apertures 17 are lined in the width direction Dw, the path length along which radio waves propagate between each of the radiation apertures 17 and the power supply opening 14, that is, the radio wave path length cannot all be the same. However, even if the radio wave path lengths between each of the radiation apertures 17 and the power supply opening 14 are different from each other, it is thought that the phases of the radio waves will be aligned when a difference between the radio wave path lengths is an integral multiple of the predetermined wavelength, which is the wavelength of the radio waves being propagated.

Based on this idea, the radio wave path length and reflection configuration between each of the radiation apertures 17 and the power supply opening 14 are adjusted by setting the shape of the inclined wall surface 163*f*, 163*h* of the cavity section 16 so that the phase of the radio wave of a predetermined wavelength is aligned among the radiation apertures 17. The shape of the inclined wall surface 163*f*, 163*h* is expressed, for example, by at least one of the orientation and the size of the inclined wall surface 163*f*, 163*h*.

Specifically, in the first cross section shown in FIG. 3, for example, when the orientation or size of the inclined wall surface 163*f* of the first side wall 163*a* is changed, the length La of the wall surface connecting the power supply opening 14 and the radiation aperture 17, which includes the inclined wall surface 163*f*, is changed accordingly. The length La of the wall surface is indicated by a broken line in FIG. 3. In this embodiment, the length of the radio wave path and the reflection configuration between each of the radiation apertures 17 and the power supply opening 14 are adjusted by adjusting the length La of the wall surface. This also applies to the second side wall 163*b*. As a result of adjusting the radio wave path length and reflection configuration, the phases of radio waves of a predetermined wavelength are aligned among the radiation apertures 17. Note that aligning the phases of the radio waves here does not mean that the phases of the radio waves match completely, but rather that the variations in the phase of the radio waves is reduced to within a certain tolerance determined from a practical standpoint.

In other words, in this embodiment, the shape of the inclined wall surface **163*f*, 163*h* is determined so that the variation in the phase of the radio wave at the radiation apertures 17 is small when a radio wave of a predetermined wavelength is propagated from the power supply opening 14 to the cavity 15**, in comparison with an antenna device of a first comparative example below.

The antenna device of the first comparative example is different from the antenna device 1 of the present embodiment in that having a cavity 15 shaped as indicated by two-dot chain lines LC1 and LC2 in the first cross section shown in FIG. 3. That is, the antenna device of the first comparative example does not have the inclined wall surface **163*f*, 163*h* in the first cross section, and the distance from the power supply opening 14 to the side wall 163 in the width direction Dw is constant regardless the position in the height direction Dh. Except for this configuration, the antenna device of the first comparative example is the same as the antenna device 1** of the present embodiment.

For example, in this embodiment, the shape of the inclined wall surface **163*f*, 163*h* of the cavity section 16 is determined by performing computer simulation so that the phase of radio waves of a predetermined wavelength is aligned across all of the radiation apertures 17**.

As shown in FIGS. 3, 6, and 7, in this embodiment, the cavity 15, the power supply opening 14, and the radiation apertures 17 are collectively referred to as a cavity integration portion 20. In other words, the cavity 15, the power supply opening 14, and the radiation apertures 17 constitute the cavity integration portion 20. The cavity integration portion 20 constitutes one space interposed between the external space SP and the waveguide path **12*a*. The cavity integration portion 20 is formed symmetrically between the one side and the other side in the width direction Dw, as shown in FIG. 3. At the same time, the cavity integration portion 20 is also formed symmetrically between the one side and the other side in the lateral direction Dwp, as shown in FIG. 7**.

As shown in FIGS. 3 and 6, the power supply opening 14 is provided to overlap the center position C of the cavity 15 on the other side of the first wall 161 in the height direction Dh. In other words, the center position C of the cavity 15 is the position of the center of gravity of the cavity 15. As shown in FIG. 6, the power supply opening 14 is arranged so as not to overlap the radiation apertures 17 in the plan view.

If the dimension Lst in the height direction Dh of the cavity 15 shown in FIG. 3 is too large, the propagation loss of radio waves in the cavity 15 will increase. For this reason, it is desirable that the dimension Lst of the cavity 15 in the height direction Dh is equal to or less than 2.0 times the wavelength of the radio wave at the operating frequency. In this embodiment, the dimension Lst of the cavity 15 in the height direction Dh is smaller than both the dimension of the cavity 15 in the width direction Dw and the dimension in the lateral direction Dwp.

Next, the operation of the antenna device 1 will be explained. As shown in FIGS. 1 to 3, in the antenna device 1 of this embodiment, for example, when a radio wave is output from the input/output section 3 of the MMIC 2, the radio wave is input to the external port 11. The radio waves input to the external port 11 pass through the waveguide path **12*a* and the power supply opening 14 in this order, as indicated by the arrow A1 in FIG. 3, and reach the cavity 15. The radio waves that have reached the cavity 15 are distributed to the six radiation apertures 17 in the cavity 15 as indicated by arrows A2, A3, A4, and are radiated from each of the six radiation apertures 17** to the external space SP.

The results of computer simulations performed on the antenna device of the first comparative example and the antenna device 1 of the present embodiment will be explained, when radio waves of a predetermined wavelength are inputted from the power supply opening 14 to the cavity 15. As the result of the computer simulations, in the antenna device of the first comparative example, it is confirmed that the phase of the radio waves at the radiation aperture 17 at the center in the width direction Dw is approximately opposite to the phase of the radio waves at the radiation apertures 17 at both ends in the width direction Dw. In contrast, in the antenna device 1 of this embodiment, it is confirmed that the phase of the radio waves is approximately the same among the three radiation apertures 17 arranged in the width direction Dw. That is, as the results of the computer simulations, it is confirmed that the variation in the phase of radio waves at the radiation apertures 17 is significantly smaller in the antenna device 1 of this embodiment, than in the antenna device of the first comparative example.

Figure 8:
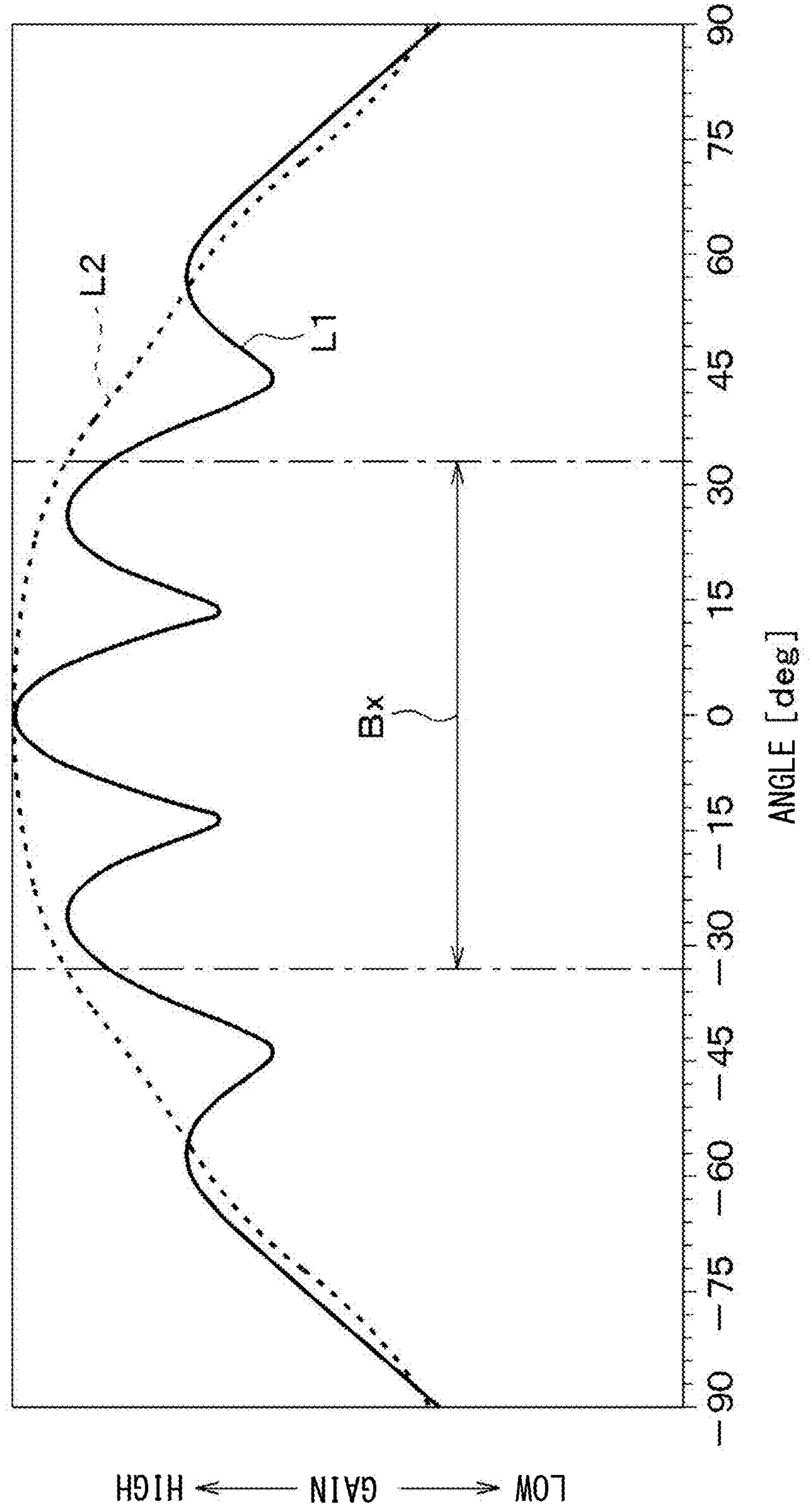
FIG. 8 is a diagram for explaining a radiation directivity of an antenna device of a first comparative example in comparison to the first embodiment.

Due to such variations in the phase of radio waves, the directivity of the radio waves radiated from the radiation apertures 17 in the antenna device of the first comparative example is shown in FIG. 8. The directivity of the radio waves radiated from the radiation apertures 17 in the antenna device 1 of the present embodiment is shown in FIG. 9.

Figure 9:
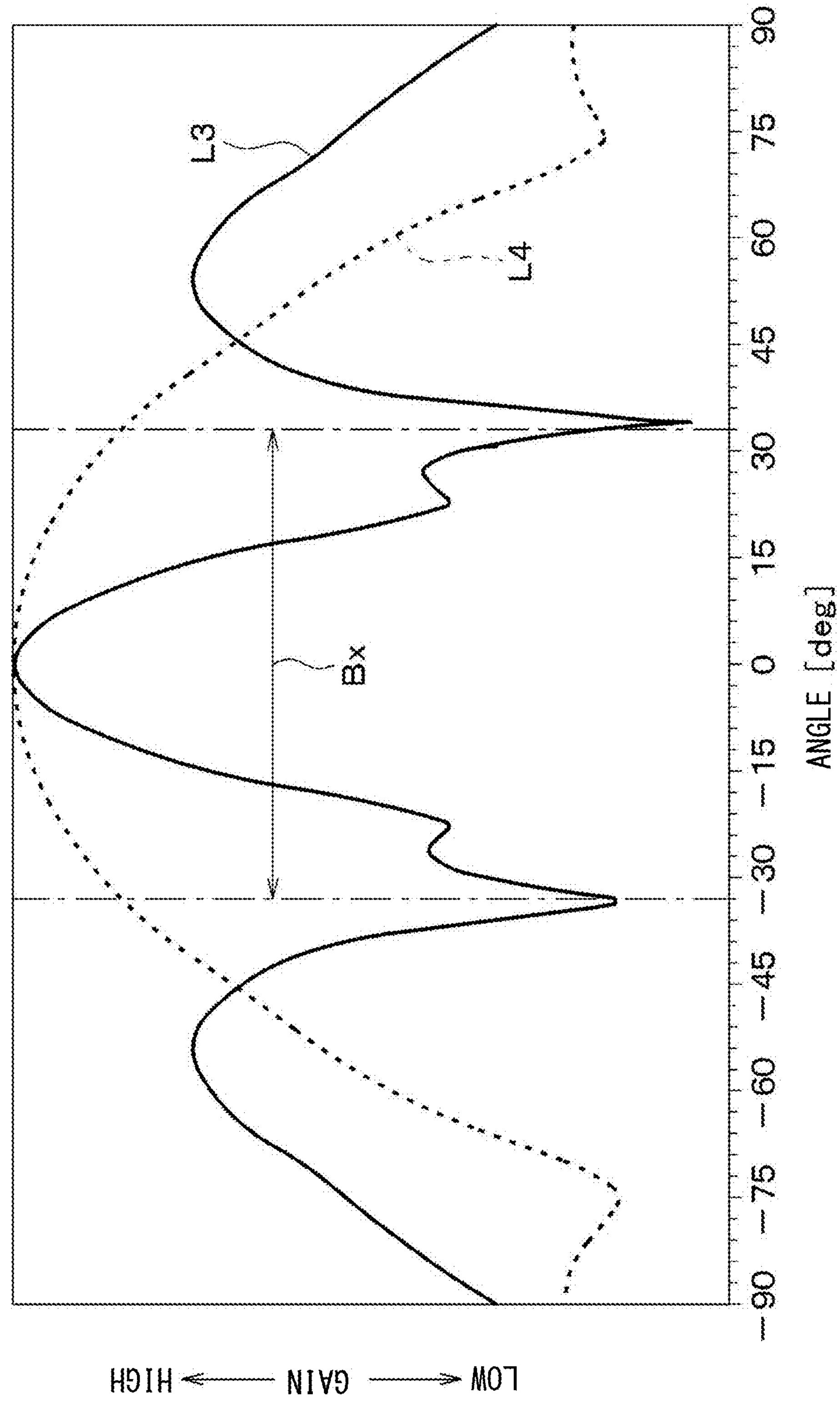
FIG. 9 is a diagram for explaining a radiation directivity of the antenna device of the first embodiment.

A solid line L1, L3 in FIGS. 8 and 9 indicates a distribution of gains on a plane parallel to the height direction Dh and the width direction Dw. A broken line L2, L4 indicates a distribution of gains on a plane parallel to the height direction Dh and the lateral direction Dwp. "0deg" on the horizontal axis in FIGS. 8 and 9 means parallel to the height direction Dh and toward one side in the height direction Dh.

As can be seen from the solid line L1 in the range Bx on the horizontal axis in FIG. 8, in the antenna device of the first comparative example, due to the difference in phase of the radio waves radiated from the radiation apertures 17, the radio waves cancel each other out. Therefore, the beam is not focused to one side in the height direction Dh. In contrast, in the antenna device 1 of this embodiment, as can be seen from the solid line L3 in the range Bx on the horizontal axis in FIG. 9, the beam is focused toward the one side in the height direction Dh, since the phase of the radio waves radiated from the radiation apertures 17 are aligned such that the radio waves are amplified. That is, from the comparison between FIG. 8 and FIG. 9, the directivity of radio waves directed to one side in the height direction Dh is higher in the antenna device 1 of this embodiment than in the antenna device of the first comparative example. The range Bx on the horizontal axis in FIGS. 8 and 9 indicates the same range between FIG. 8 and FIG. 9.

For example, when the input/output section 3 of the MMIC 2 receives radio waves from the external space SP, the antenna device 1 propagates the radio waves in the opposite direction to the case where the radio waves are output from the input/output section 3.

As described above, according to the present embodiment, in the first cross section (for example, the cross section in FIG. 3), the inclined wall surface **163*f* of the first side wall 163*a* is formed so that a distance W1 in the width direction Dw from the power supply opening 14 to the inclined wall surface 163*f* becomes larger toward one side in the height direction Dh. In first cross section, the inclined wall surface 163***h* of the second side wall 163*b* is formed such that the distance W2 in the width direction Dw from the power supply opening 14 to the inclined wall surface 163*h* becomes larger toward one side in the height direction Dh. Furthermore, the shape of the inclined wall surface 163*f*, 163*h* is determined so that the variation in the phase of the radio waves at the radiation apertures 17 is reduced when radio waves of a predetermined wavelength are propagated from the power supply opening 14 to the cavity 15, in comparison with the antenna device of the first comparative example.

Therefore, the path length through which radio waves propagate between each of the radiation apertures 17 and the power supply opening 14 and the reflection configuration of the radio waves are adjusted by setting the shapes of the inclined wall surface 163*f*, 163*h*. Therefore, while three or more radiation apertures 17 are arranged side by side in the width direction Dw, there is an advantage that the phases of the radio waves at the radiation apertures 17 can be easily aligned with each other.

In addition, since a single cavity 15 distributes radio waves to three or more radiation apertures 17, it is possible to suppress the increase in the size of the antenna device 1 in the height direction Dh, compared to the conventional structure in which the radio wave propagation path is branched into a tournament shape.

Therefore, according to the antenna device 1 of the present embodiment, it is easy to align the phases of radio waves among the large number of radiation apertures 17 arranged in three or more in the width direction Dw, while it is possible to suppress the increase in the size of the antenna device 1.

Further, since the radiation apertures 17 can be easily increased in the width direction Dw without restriction while aligning the phases of the radio waves at the radiation apertures 17, it is possible to realize a high gain of the antenna device 1.

If three or more radiation apertures are to be provided in a structure in which the radio wave propagation path is branched into a tournament shape, a stacked structure is required in which radio waves in the waveguide are distributed into two layers. This causes an increase in manufacturing costs.

According to the antenna device 1 of the present embodiment, the single cavity 15 distributes radio waves to the six radiation apertures 17. Since the antenna device 1 can be realized with a simple stacked structure, it can be easily manufactured to reduce costs.

(1) According to the present embodiment, the power supply opening 14 is provided so as to overlap with the center position C of the cavity 15 on the other side in the height direction Dh. Therefore, the radio waves are easily propagated evenly within the cavity 15. Accordingly, it can contribute to aligning the phases of the radio waves at the radiation apertures 17.

(2) According to the present embodiment, the cavity 15, the power supply opening 14, and the radiation apertures 17 constitute the cavity integration portion 20. The cavity integration portion 20 is formed symmetrically between the one side and the other side in the width direction Dw, as shown in FIG. 3. At the same time, the cavity integration portion 20 is also formed symmetrically between the one side and the other side in the lateral direction Dwp, as shown in FIG. 7. Therefore, it is easy to propagate radio waves evenly between each of the radiation apertures 17 connected to the cavity 15 and the power supply opening 14. Accordingly, it can contribute to aligning the phases of the radio waves at the radiation apertures 17.

(3) According to the present embodiment, the waveguide section 12 is provided on one side in the waveguide extending direction Da with respect to the open position where the power supply opening 14 opens with respect to the waveguide path 12*a*, and has the first end wall 123 forming the end of the waveguide path 12*a*. In addition, the waveguide section 12 includes the reflection suppressing wall 13 provided on the other side in the waveguide extending direction Da with respect to the open position of the power supply opening 14 so as to suppress reflection of radio waves.

Accordingly, the influence of reflected waves from the first end wall 123 and the like is reduced by the reflection suppressing wall 13, so that restriction of the band due to the influence of reflected waves can be suppressed. As a result, the antenna device 1 can have a wider band.

Modifications to First Embodiment

The antenna device 1 of the first embodiment can be modified as follows. Each of the modifications is the same as the first embodiment excepts the points described below. Moreover, each of the modifications can be applied to embodiments other than the first embodiment.

First Modification

Figure 10:
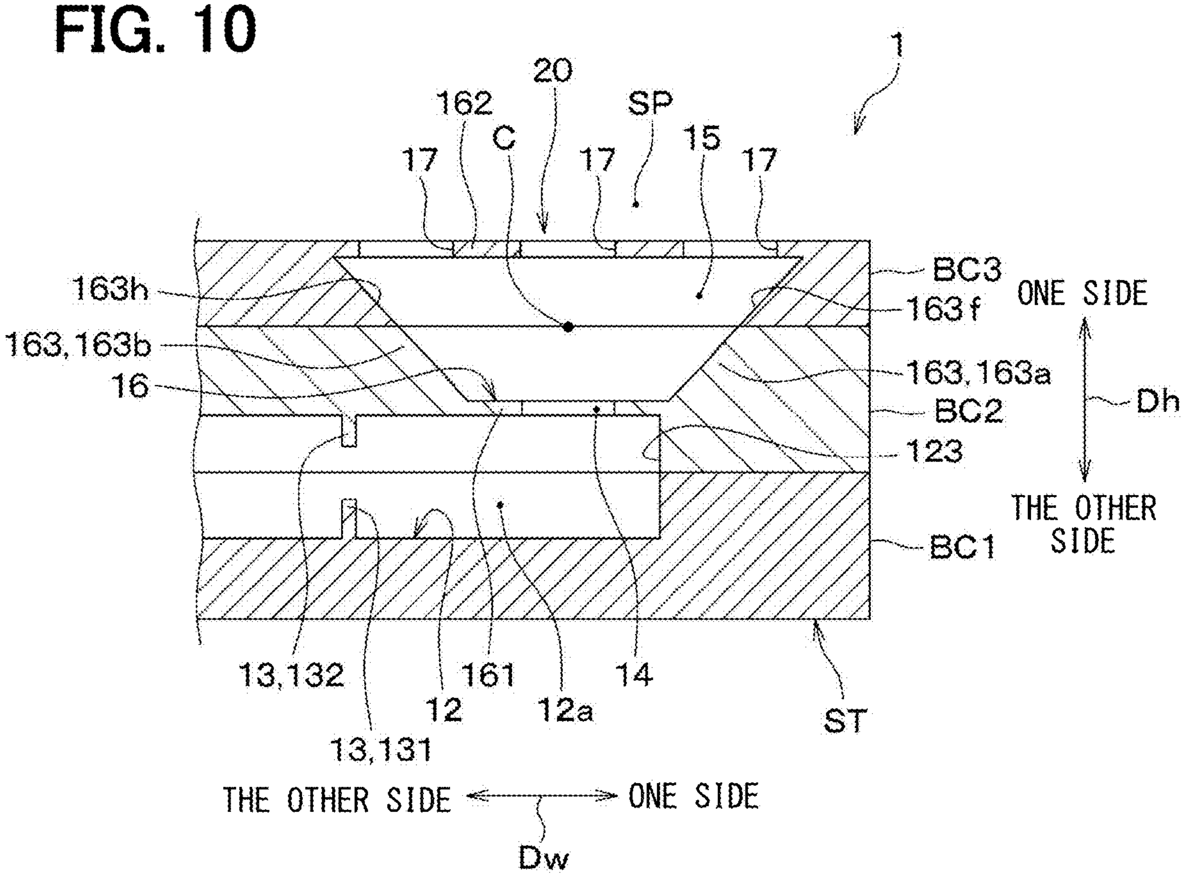
FIG. 10 is a schematic cross-sectional view showing an antenna device, corresponding to FIG. 3, in a first modification of the first embodiment.

In the first embodiment, as shown in FIG. 3, each of the first side wall 163*a* and the second side wall 163*b* has the vertical wall surface 163*e*, 163*g* facing the cavity 15 and the inclined wall surface 163*f*, 163*h*, but is not limited to this. In this modification, as shown in FIG. 10, an inclined wall surface 163*f*, 163*h* which is an inclined surface is provided to extend entirely in the height direction Dh of the cavity 15, instead of the vertical wall surface 163*e*, 163*g* whose normal direction is the width direction Dw.

Second Modification

Figure 11:
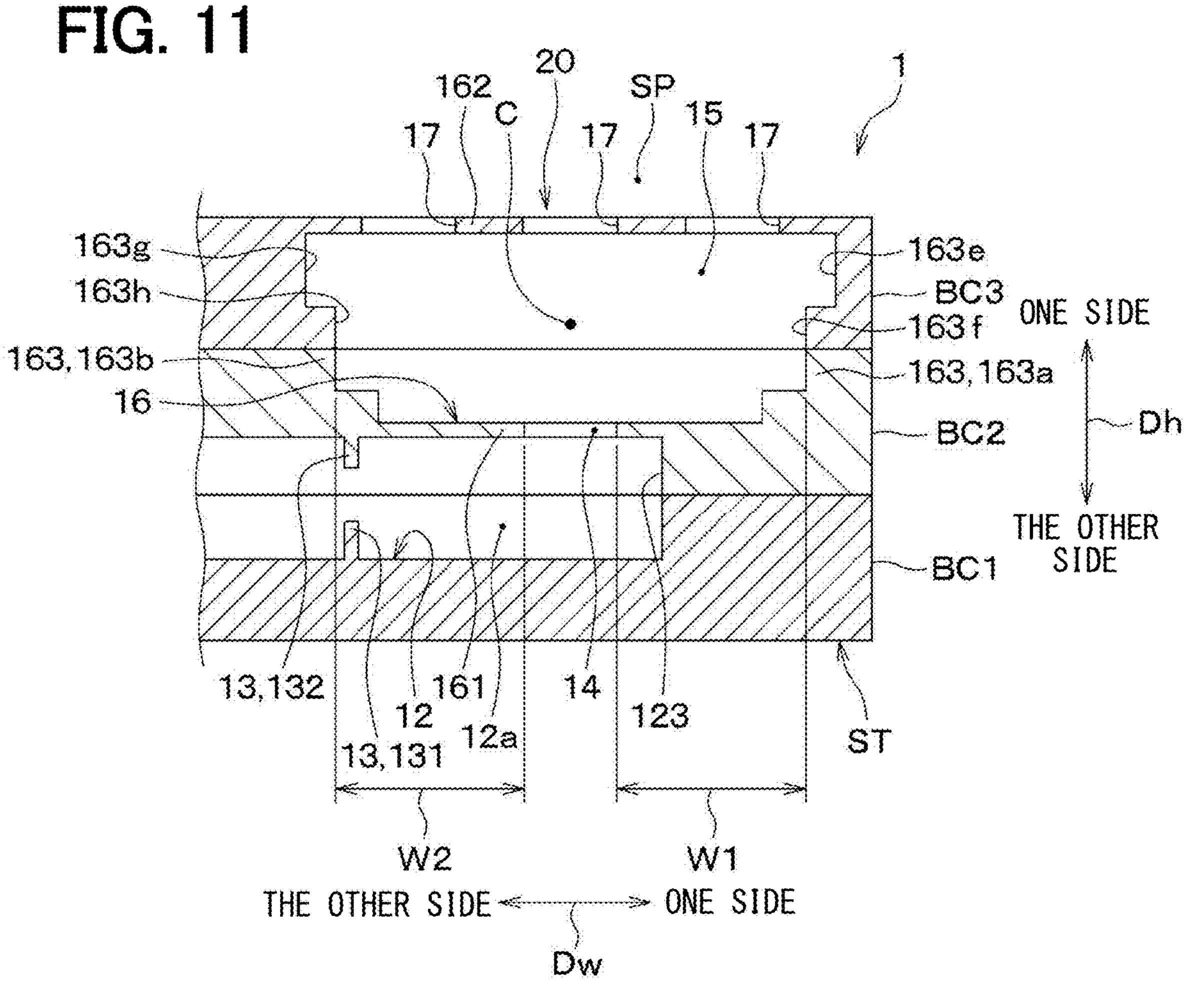
FIG. 11 is a schematic cross-sectional view showing an antenna device, corresponding to FIG. 3, in a second modification of the first embodiment.

As shown in FIG. 11, in this modification, unlike the first embodiment, the inclined wall surface 163*f*, 163*h* is not limited to be located inside of the second block BC2, but extends to the third block BC3. Further, in this modification, unlike the first embodiment, the inclined wall surface 163*f*, 163*h* is not an inclined surface formed of a plane inclined with respect to the height direction Dh.

Specifically, the inclined wall surface 163*f*, 163*h* of this modification is configured as stepped surface in which the distance W1, W2 in the width direction Dw from the power supply opening 14 changes in a stepwise manner. That is, in this modification, in the first cross section, which is shown in FIG. 11, for example, the inclined wall surface 163*f* of the first side wall 163*a* is formed so that a distance W1 in the width direction Dw from the power supply opening 14 to the inclined wall surface 163*f* becomes larger stepwise toward one side in the height direction Dh. In the first cross section, the inclined wall surface 163*h* of the second side wall 163*b* is formed such that the distance W2 in the width direction Dw from the power supply opening 14 to the inclined wall surface 163*h* becomes larger stepwise toward one side in the height direction Dh.

In this modification, the shape of the inclined wall surface 163*f*, 163*h* includes an orientation at each location of the inclined wall surface 163*f*, 163*h*, the number of steps and the size of the inclined wall surface 163*f*, 163*h* configured with stepped surface. As an example of the shape of the inclined wall surface 163*f*, 163*h*, the rate of change in the distance W1, W2 in the width direction Dw from the power supply opening 14 to the inclined wall surface 163*f*, 163*h* with respect to a change in position in the height direction Dh is included.

In this modification, the stepped inclined wall surface 163*f*, 163*h* extends to both the second block BC2 and the third block BC3, but may be formed only in one of the second block BC2 and the third block BC3.

Third Modification

Figure 12:
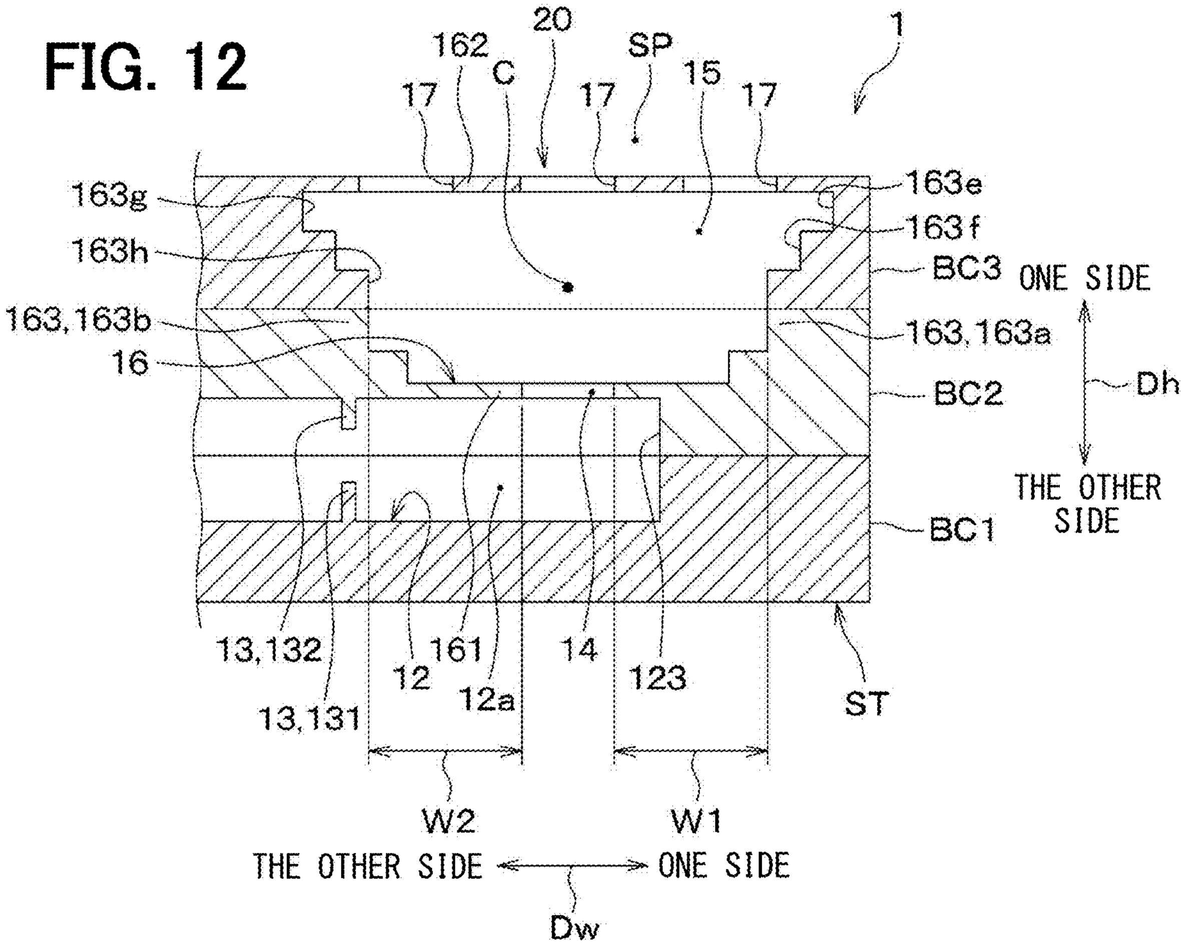
FIG. 12 is a schematic cross-sectional view showing an antenna device, corresponding to FIG. 3, in a third modification of the first embodiment.

As shown in FIG. 12, in this modification, similarly to the second modification, the inclined wall surface 163*f*, 163*h* is composed of a stepped surface in which the distance W1, W2 in the width direction Dw from the power supply opening 14 changes in a step-like manner. However, in this modification, the number of steps of the inclined wall surface 163*f*, 163*h* is increased compared to the second modification. That is, the number of steps in the inclined wall surface 163*f*, 163*h* is not limited.

Second Embodiment

A second embodiment of the present disclosure is described. This embodiment is explained mainly with respect to points different from the first embodiment. In addition, explanations of the same or equivalent portions as those in the above embodiment is omitted or simplified. The same applies to description of embodiments described later.

Figure 13:
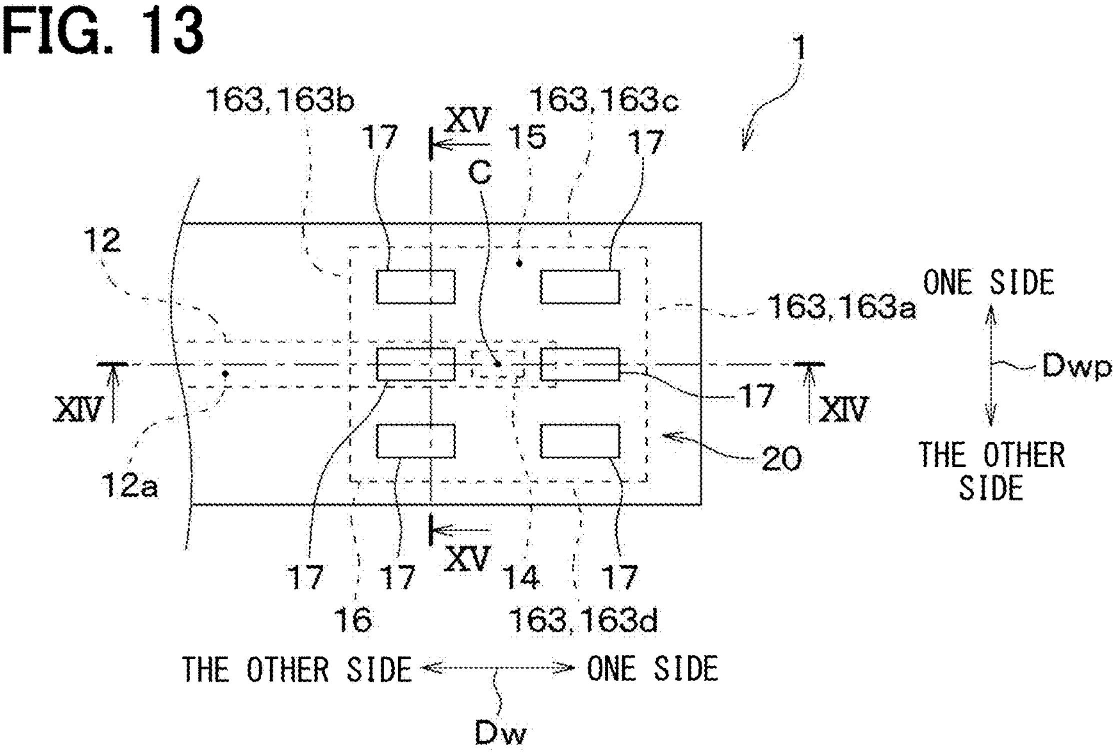
FIG. 13 is a plan view illustrating an antenna device according to a second embodiment, corresponding to FIG. 6, which is a view of a portion VI in FIG. 1.
Figure 14:
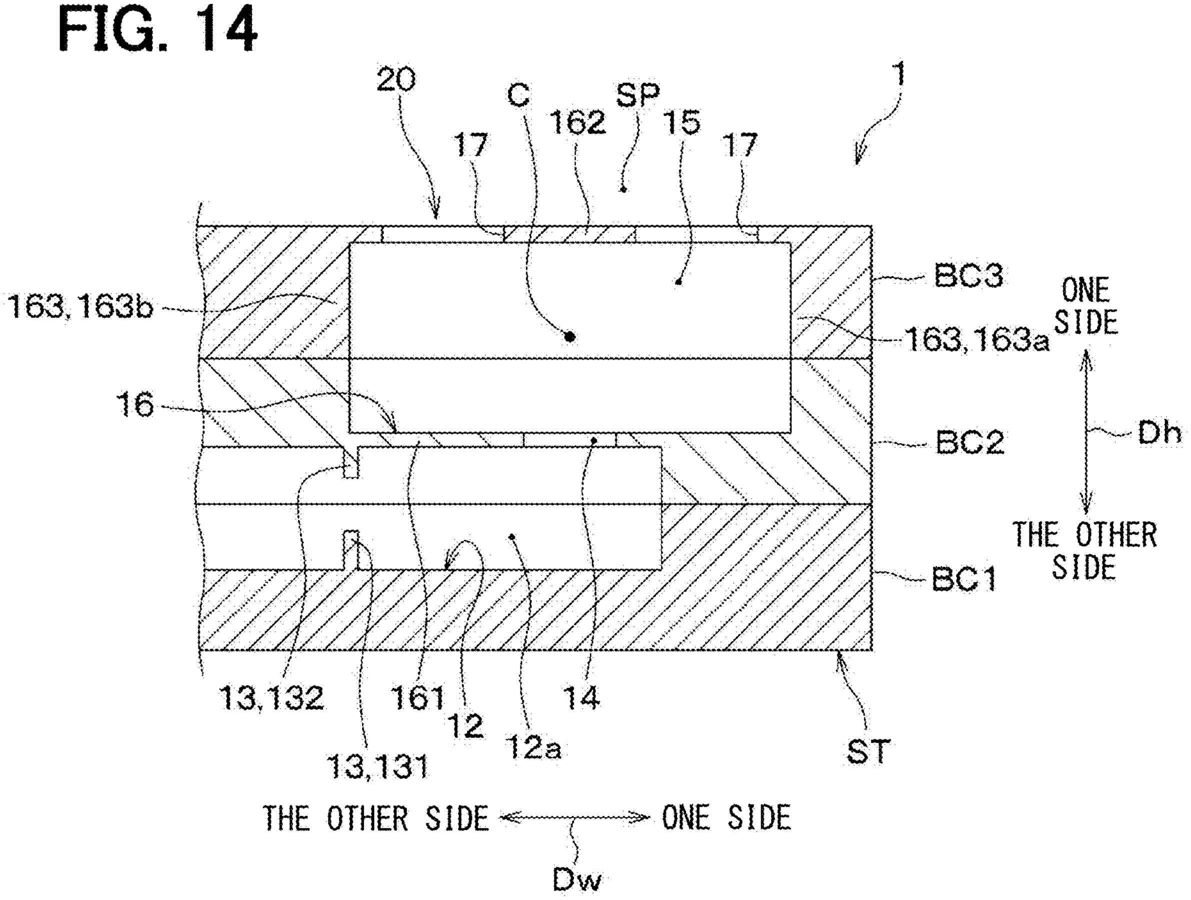
FIG. 14 is a cross-sectional view taken along line XIV-XIV in FIG. 13 in the second embodiment.
Figure 15:
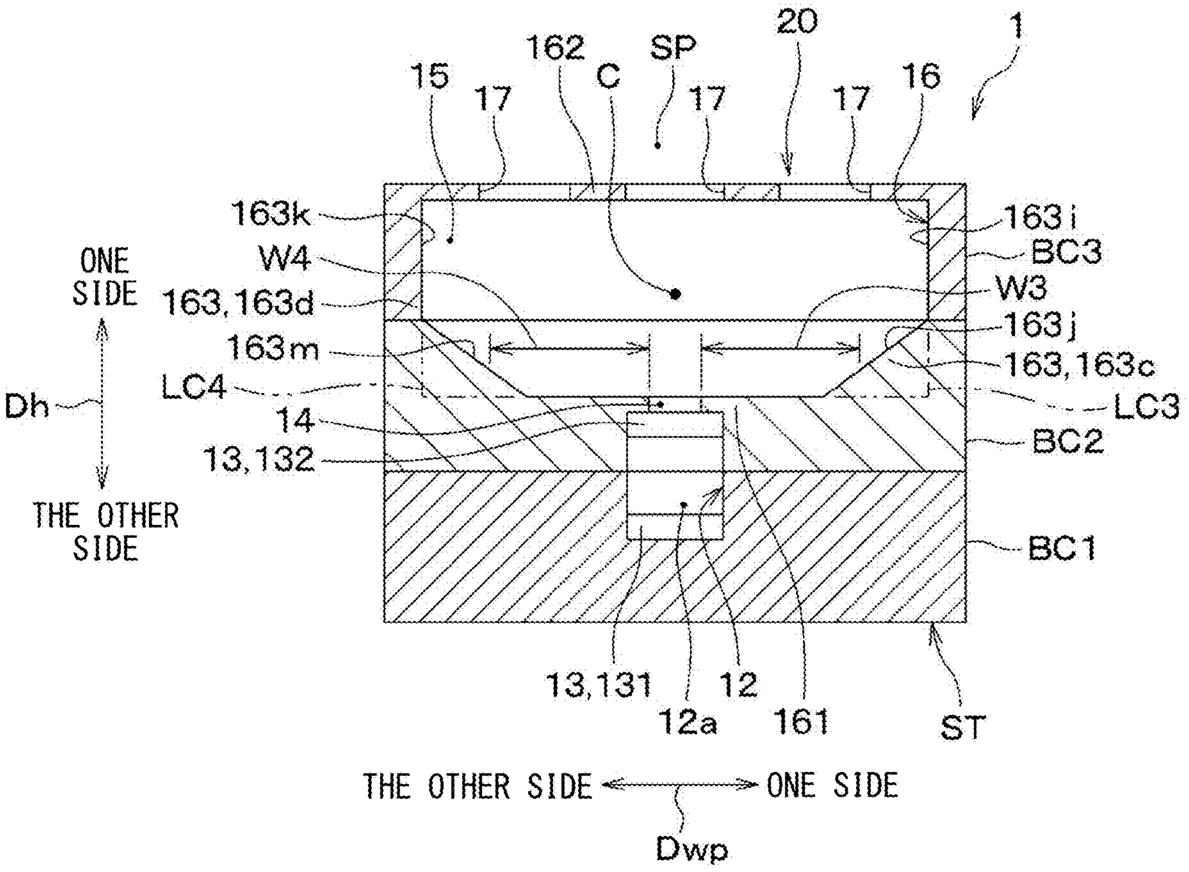
FIG. 15 is a cross-sectional view taken along line XV-XV in FIG. 13 in the second embodiment.

As shown in FIGS. 13 to 15, in this embodiment, the radiation apertures 17 are arranged in a 3×2 grid pattern, and a total of six radiation apertures 17 are provided. In this respect, the present embodiment is similar to the first embodiment, but unlike the first embodiment, the radiation apertures 17 are arranged in two in the width direction Dw, and arranged in three in the lateral direction Dwp at equal intervals.

In this embodiment, the height direction Dh corresponds to a first direction of the present disclosure, as in the first embodiment. However, in this embodiment, unlike the first embodiment, the lateral direction Dwp corresponds to a second direction of the present disclosure, and the width direction Dw corresponds to a third direction of the present disclosure.

Further, in this embodiment, the configuration of a side wall 163 of the cavity section 16 is different from that in the first embodiment. Specifically, as shown in FIG. 14, the first side wall 163*a* and the second side wall 163*b* of the side wall 163 are not inclined with respect to the height direction Dh, but are parallel to the height direction Dh. Each of the first side wall 163*a* and the second side wall 163*b* forms a planar wall surface facing the cavity 15 with the width direction Dw as the normal direction, and are arranged to face each other in the width direction Dw with the cavity 15 in between.

As shown in FIG. 15, the third side wall 163*c* and the fourth side wall 163*d* of the side wall 163 are arranged opposite to each other in the lateral direction Dwp with the cavity 15 in between. The third side wall 163*c* and the fourth side wall 163*d* are shown in a second cross section (for example, the cross section in FIG. 15) along the height direction Dh and the lateral direction Dwp. In this embodiment, the second cross section is perpendicular to the first cross section.

Although the line XV-XV in FIG. 13 does not pass through the power supply opening 14, the power supply opening 14 is shown in FIG. 15 for easy viewing. Such a method of illustrating a cross-section is similarly adopted in the following cross-sectional views.

Each of the third side wall 163*c* and the fourth side wall 163*d* has a vertical wall surface 163*i*, 163*k* facing the cavity 15, and an inclined wall surface 163*j*, 163*m* facing the cavity 15 and arranged on the other side in the height direction Dh with respect to the vertical wall surface 163*i*, 163*k*. In this embodiment, the inclined wall surface 163*j*, 163*m* corresponds to a second-direction changing surface of the present disclosure.

The inclined wall surface 163*j* of the third side wall 163*c* is provided between the vertical wall surface 163*i* of the third side wall 163*c* and the first wall 161, and connects the vertical wall surface 163*i* and the first wall 161. Further, the inclined wall surface 163*m* of the fourth side wall 163*d* is provided between the vertical wall surface 163*k* of the fourth side wall 163*d* and the first wall 161, and connects the vertical wall surface 163*k* and the first wall 161.

The vertical wall surface 163*i*, 163*k* is formed into a planar shape with the lateral direction Dwp as the normal direction. The inclined wall surface 163*j*, 163*m* has a planar shape extending along the width direction Dw, but is formed as inclined surface inclined with respect to the height direction Dh.

Specifically, in the second cross section shown in FIG. 15, for example, the inclined wall surface 163*j* of the third side wall 163*c* is formed so that a distance W3 in the lateral direction Dwp from the power supply opening 14 to the inclined wall surface 163*j* becomes larger continuously toward one side in the height direction Dh. Similarly, in the second cross section, the inclined wall surface 163*m* of the fourth side wall 163*d* is formed so that a distance W4 in the lateral direction Dwp from the power supply opening 14 to the inclined wall surface 163*m* becomes continuously larger toward one side in the height direction Dh.

In this embodiment, the inclined wall surface 163*j*, 163*m* is formed in the second block BC2, and the vertical wall surface 163*i*, 163*k* is formed in the third block BC3.

Further, the shape of the inclined wall surface 163*j*, 163*m* in this embodiment is determined using the same method as the shape of the inclined wall surface 163*f*, 163*h* in the first embodiment. That is, in this embodiment, the shape of the inclined wall surface 163*j*, 163*m* is set, for example, by performing a computer simulation, such that the phases of radio waves of predetermined wavelength are aligned among all of the radiation apertures 17.

In other words, in this embodiment, the shape of the inclined wall surface 163*j*, 163*m* is determined so that the variation in the phase of the radio wave at the radiation apertures 17 is reduced when the radio waves of a predetermined wavelength is propagated from the power supply opening 14 to the cavity 15, compared with the antenna device of the comparative example.

The antenna device of the second comparative example is different from the antenna device 1 of the present embodiment, and has a cavity 15 shaped as indicated by two-dot chain line LC3, LC4 in the second cross section shown in FIG. 15. That is, in the antenna device of the second comparative example, the inclined wall surface 163*j*, 163*m* is not provided in the second cross section, and the distance in the width direction Dw from the power supply opening 14 to the side wall 163 is constant independent of the position in the height direction Dh. Except for this configuration, the antenna device of the second comparative example is the same as the antenna device 1 of the present embodiment.

In this embodiment, the cavity integration portion 20 has a symmetrical shape as in the first embodiment. That is, the cavity integration portion 20 of this embodiment is formed symmetrically between the one side and the other side in the width direction Dw as shown in FIG. 14, and is formed symmetrically between the one side and the other side in the lateral direction Dwp as shown in FIG. 15.

(1) As described above, according to the present embodiment, in the second cross section (for example, the cross section in FIG. 15), the inclined wall surface 163*j* of the third side wall 163*c* is formed such that the distance W3 in the lateral direction Dwp from the power supply opening 14 to the inclined wall surface 163*j* becomes larger toward one side in the height direction Dh. In addition, in the second cross section, the inclined wall surface 163*m* of the fourth side wall 163*d* is formed such that the distance W4 in the lateral direction Dwp from the power supply opening 14 to the inclined wall surface 163*m* increases toward one side in the height direction Dh. Furthermore, each shape of the inclined wall surface 163*j*, 163*m* is determined such that the variation in the phase of the radio waves at the radiation apertures 17 is reduced when the radio waves of a predetermined wavelength are propagated from the power supply opening 14 to the cavity 15 in comparison with the antenna device of the second comparative example.

Therefore, the same effects as the inclined wall surface 163*f*, 163*h* in the first embodiment can be obtained by the inclined wall surface 163*j*, 163*m*. That is, even if three or more radiation apertures 17 are arranged side by side in the lateral direction Dwp, there is an advantage that the phases of the radio waves at the radiation apertures 17 can be easily aligned with each other.

Further, since it is easy to increase the number of radiation apertures 17 without restriction in the lateral direction Dwp while aligning the phases of the radio waves at the radiation apertures 17, it is possible to realize a high gain of the antenna device 1.

This embodiment is similar to the first embodiment, except for the above-described aspects. Thus, this embodiment can achieve the advantages obtained by the configuration common to the first embodiment in a similar manner as in the first embodiment.

Modifications of Second Embodiment

The antenna device 1 shown in the second embodiment can be modified as follows. Each of the modifications shown below is the same as the second embodiment with respect to points other than those described below. Moreover, each of the modifications can be applied to embodiments other than the second embodiment unless there is any particular problem.

First Modification

Figure 16:
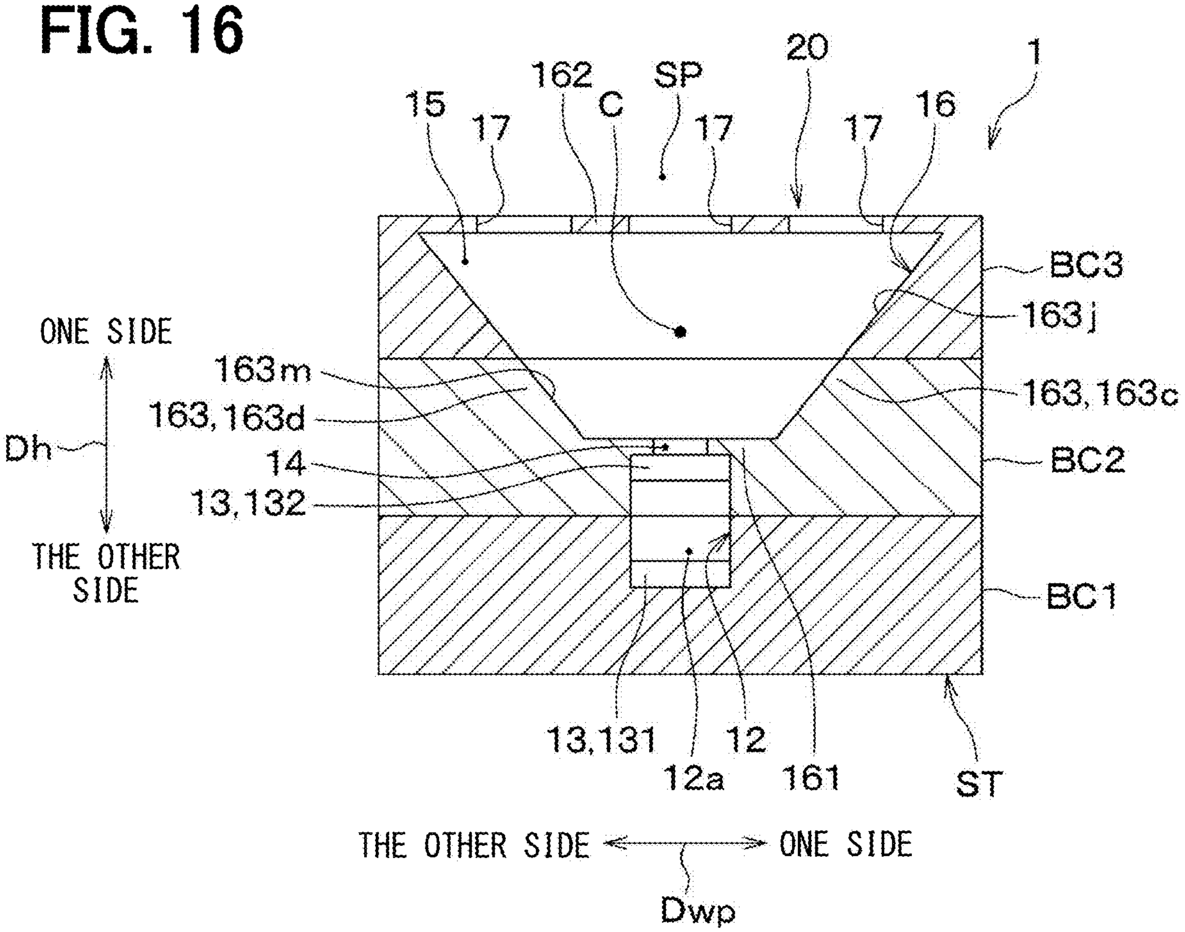
FIG. 16 is a schematic sectional view showing an antenna device, corresponding to FIG. 15, in a first modification of the second embodiment.

In the second embodiment, as shown in FIG. 15, the third side wall 163*c* and the fourth side wall 163*d* respectively have the vertical wall surfaces 163*i* and 163*k* facing the cavity 15 and the inclined wall surfaces 163*j* and 163*m*. This is an example. In this modification, as shown in FIG. 16, the vertical wall surface 163*i*, 163*k* whose normal direction is the lateral direction Dwp is not provided, and an inclined wall surface 163*j*, 163*m* which is an inclined surface, extends over the entire width of the cavity 15 in the height direction Dh.

Second Modification

Figure 17:
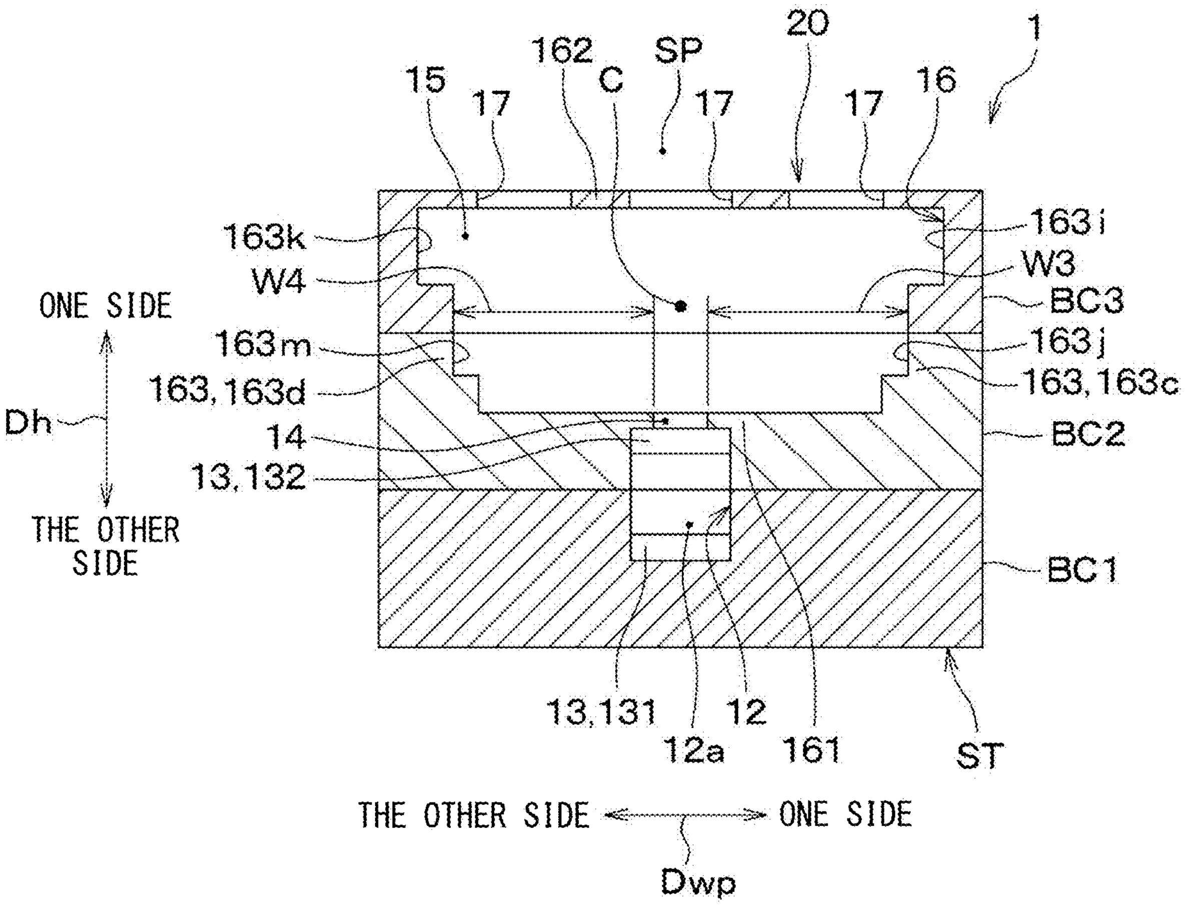
FIG. 17 is a schematic sectional view showing an antenna device, corresponding to FIG. 15, in a second modification of the second embodiment.

As shown in FIG. 17, in this modification, unlike the second embodiment, the inclined wall surface 163*j*, 163*m* is not limited to be located inside of the second block BC2, but extends from the second block BC2 to the third block BC3. Furthermore, in this modification, unlike the second embodiment, the inclined wall surface 163*j*, 163*m* is not an inclined surface formed of a plane inclined with respect to the height direction Dh.

Specifically, the inclined wall surface 163*j*, 163*m* of this modification is configured as stepped surface in which the distance W3, W4 in the lateral direction Dwp relative to the power supply opening 14 changes in a stepwise manner. That is, in this modification, in the second cross section, which is the cross section in FIG. 17, the inclined wall surface 163*j* of the third side wall 163*c* is formed so that the distance W3 in the lateral direction Dwp from the power supply opening 14 to the inclined wall surface 163*j* becomes larger stepwise toward one side in the height direction Dh. In the second cross section, the inclined wall surface 163*m* of the fourth side wall 163*d* is formed such that the distance W4 in the lateral direction Dwp from the power supply opening 14 to the inclined wall surface 163*m* increases stepwise toward one side in the height direction Dh.

In this modification, examples of the shape of the inclined wall surface 163*j*, 163*m* includes the orientation at each part of the inclined wall surface 163*j*, 163*m*, the number of steps of the inclined wall surface 163*j*, 163*m* composed of stepped surface, and the size of the inclined wall surface 163*j*, 163*m*. As an example of the shape of the inclined wall surface 163*j*, 163*m*, the rate of change of the distance W3, W4 in the lateral direction Dwp from the power supply opening 14 to the inclined wall surface 163*j*, 163*m* with respect to a change in position in the height direction Dh is included.

In this modification, the stepped inclined wall surface 163*j*, 163*m* extends to both the second block BC2 and the third block BC3, but may be formed only in one of the second block BC2 and the third block BC3.

Third Modification

Figure 18:
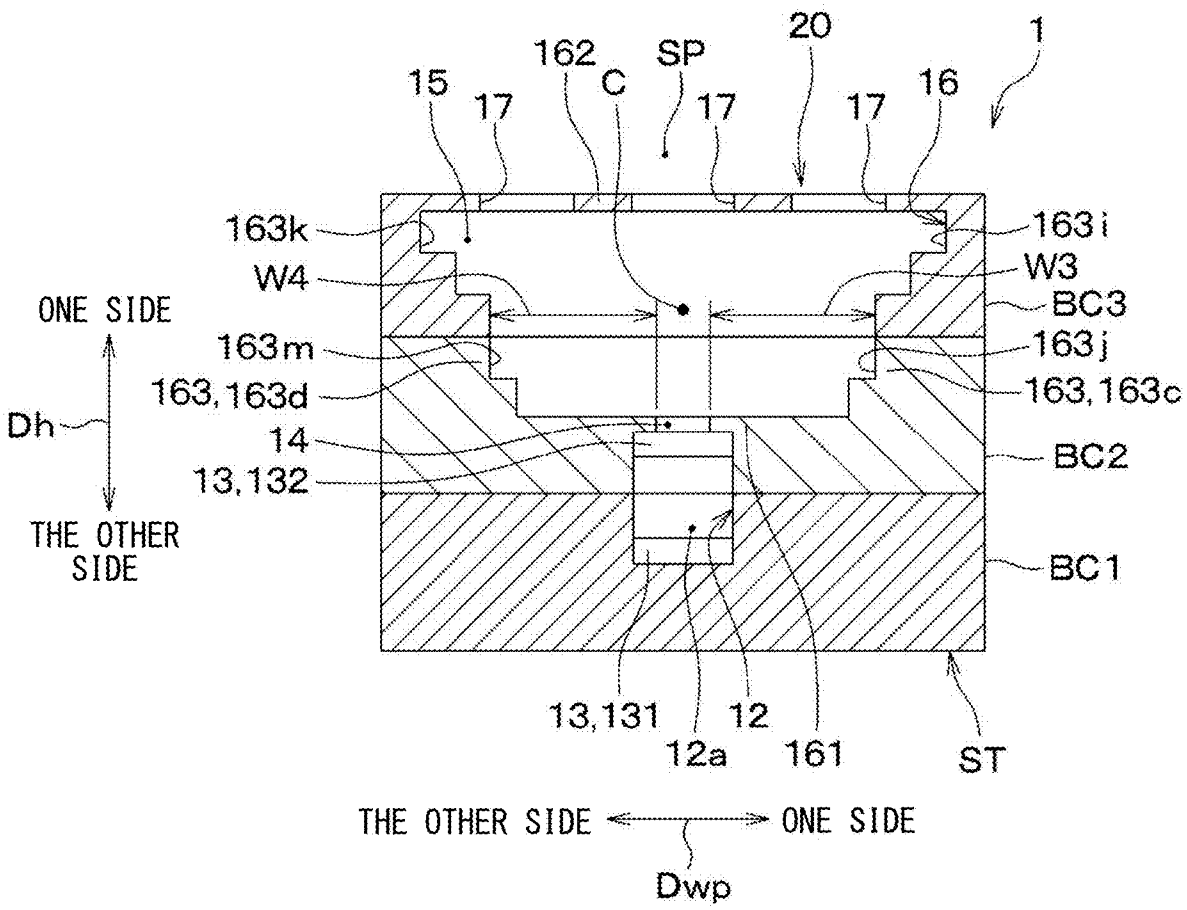
FIG. 18 is a schematic sectional view showing an antenna device, corresponding to FIG. 15, in a third modification of the second embodiment.

As shown in FIG. 18, in this modification, similarly to the second modification, the inclined wall surface 163*j*, 163*m* is formed of stepped surface such that the distance W3, W4 in the lateral direction Dwp from the power supply opening 14 changes in a step-like manner. However, in this modification, the number of steps of the inclined wall surface 163*j*, 163*m* configured as step surfaces is increased compared to the second modification. That is, the number of steps of the inclined wall surface 163*j*, 163*m* is not limited.

Third Embodiment

A third embodiment is described next.

Figure 19:
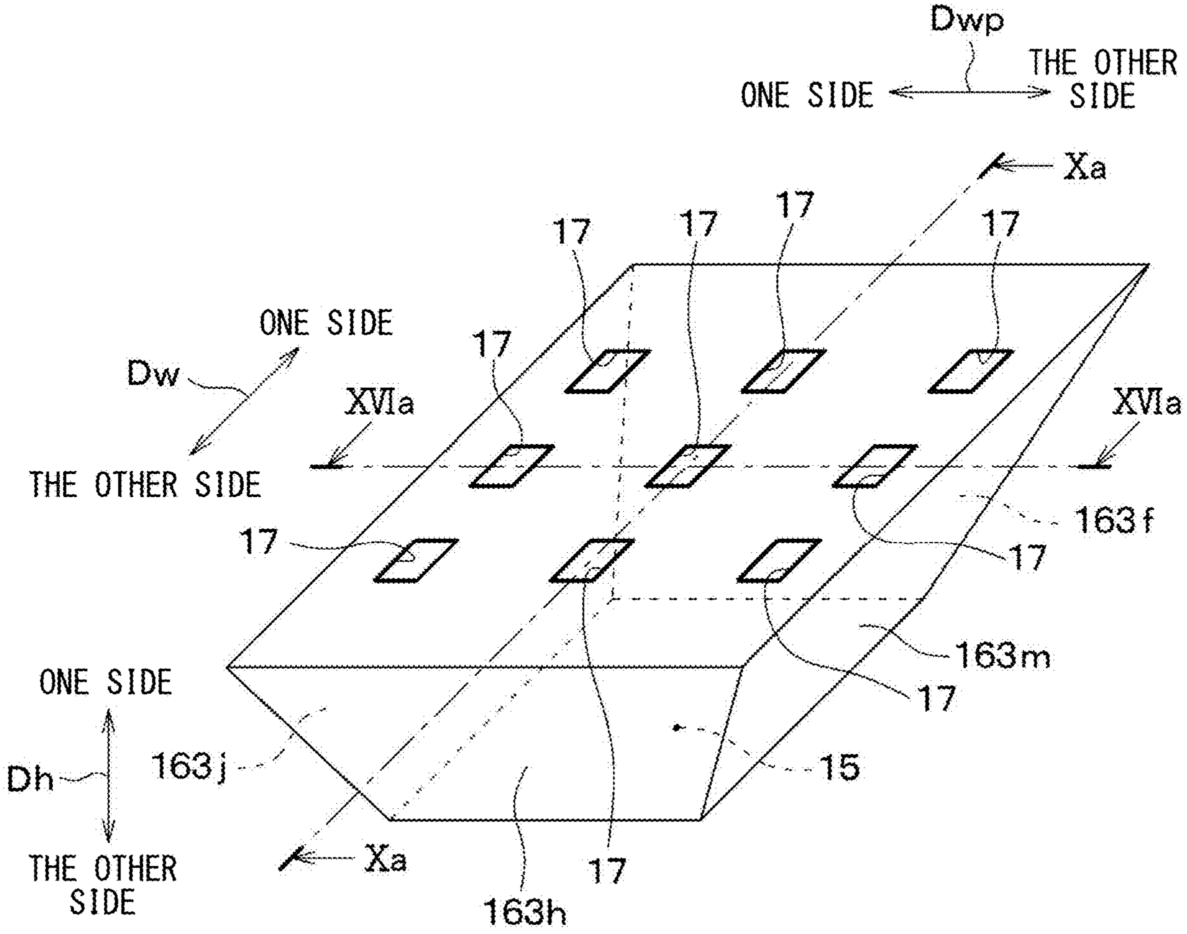
FIG. 19 is a schematic perspective view of a cavity and radiation apertures of an antenna device according to a third embodiment, showing an image of the shapes of the cavity and the radiation apertures.

As shown in FIG. 19, in this embodiment, the first modification of the first embodiment and the first modification of the second embodiment are combined. For example, the Xa-Xa cross section in FIG. 19 is shown in FIG. 10, and the XVIa-XVIa cross section in FIG. 19 is shown in FIG. 16.

In this embodiment, the height direction Dh corresponds to a first direction of the present disclosure, the width direction Dw corresponds to a second direction of the present disclosure, and the lateral direction Dwp corresponds to a third direction of the present disclosure. Further, in this embodiment, the inclined wall surface 163*f*, 163*h* corresponds to a second-direction changing surface of the present disclosure, and the inclined wall surface 163*j*, 163*m* correspond to a third-direction changing surface of the present disclosure. Further, the first cross section (for example, the cross section in FIG. 10) along the height direction Dh and the width direction Dw corresponds to a first cross section of the present disclosure, and the second cross section (for example, the cross section in FIG. 16) along the height direction Dh and the lateral direction Dwp corresponds to a second cross section of the present disclosure.

Specifically, in this embodiment, the radiation apertures 17 are arranged in a 3×3 grid pattern, and a total of nine radiation apertures 17 are provided. That is, three of the radiation apertures 17 are arranged at equal intervals in the width direction Dw, and three are arranged at equal intervals in the lateral direction Dwp.

As shown in FIG. 10, the first side wall 163*a* of this embodiment has an inclined wall surface 163*f* similarly to the first modification of the first embodiment, and the second side wall 163*b* of this embodiment has an inclined wall surface 163*h* similarly to the first modification of the first embodiment. As shown in FIG. 16, the third side wall 163*c* of this embodiment has an inclined wall surface 163*j* similarly to the first modification of the second embodiment, and the fourth side wall 163*d* of this embodiment has an inclined wall surface 163*m* as in the first modification of the second embodiment.

Therefore, in this embodiment, the shape of the inclined wall surface 163*f*, 163*h* is determined in the same manner as in the first modification of the first embodiment. The shape of the inclined wall surface 163*j*, 163*m* is determined in the same manner as in the first modification of the second embodiment. That is, in this embodiment, each shape of the inclined wall surface 163*f*, 163*h*, 163*j*, 163*m* of the cavity section 16 is set such that the phase of the radio wave is aligned among all of the radiation apertures 17 when the radio wave of a predetermined wavelength is propagated from the power supply opening 14 to the cavity 15. For example, similarly to the first modification of the first embodiment and the first modification of the second embodiment, the shape of the inclined wall surface 163*f*, 163*h*, 163*j*, 163*m* is determined by computer simulation in this embodiment.

From the above, the effects produced by the inclined wall surface 163*f*, 163*h* in the first modification of the first embodiment, and the effects of the inclined wall surface 163*j*, 163*m* in the first modification of the second embodiment can be enjoyed at the same time. This makes it easy to increase the number of radiation apertures 17 without restriction in the width direction Dw and the lateral direction Dwp while aligning the phases of the radio waves at the radiation apertures 17, such that it is possible to realize a high gain of the antenna device 1.

Since a large number of radiation apertures 17 can be arranged two-dimensionally in the width direction Dw and the lateral direction Dwp, compared to the case where the three or more radiation apertures 17 are limited to be arranged in a single direction, it becomes much easier to achieve high gain while suppressing the increase in the size of the antenna device 1.

Except for what has been described above, this embodiment is the same as the first modification of the first embodiment or the first modification of the second embodiment. In this embodiment, the same effects as in the first modification of the first embodiment can be obtained from the same configuration as in the first modification of the first embodiment. In this embodiment, the same effects as in the first modification of the second embodiment can be obtained from the same configuration as in the first modification of the second embodiment.

Fourth Embodiment

A fourth embodiment is described next. The present embodiment will be explained mainly with respect to portions different from those of the third embodiment.

Figure 20:
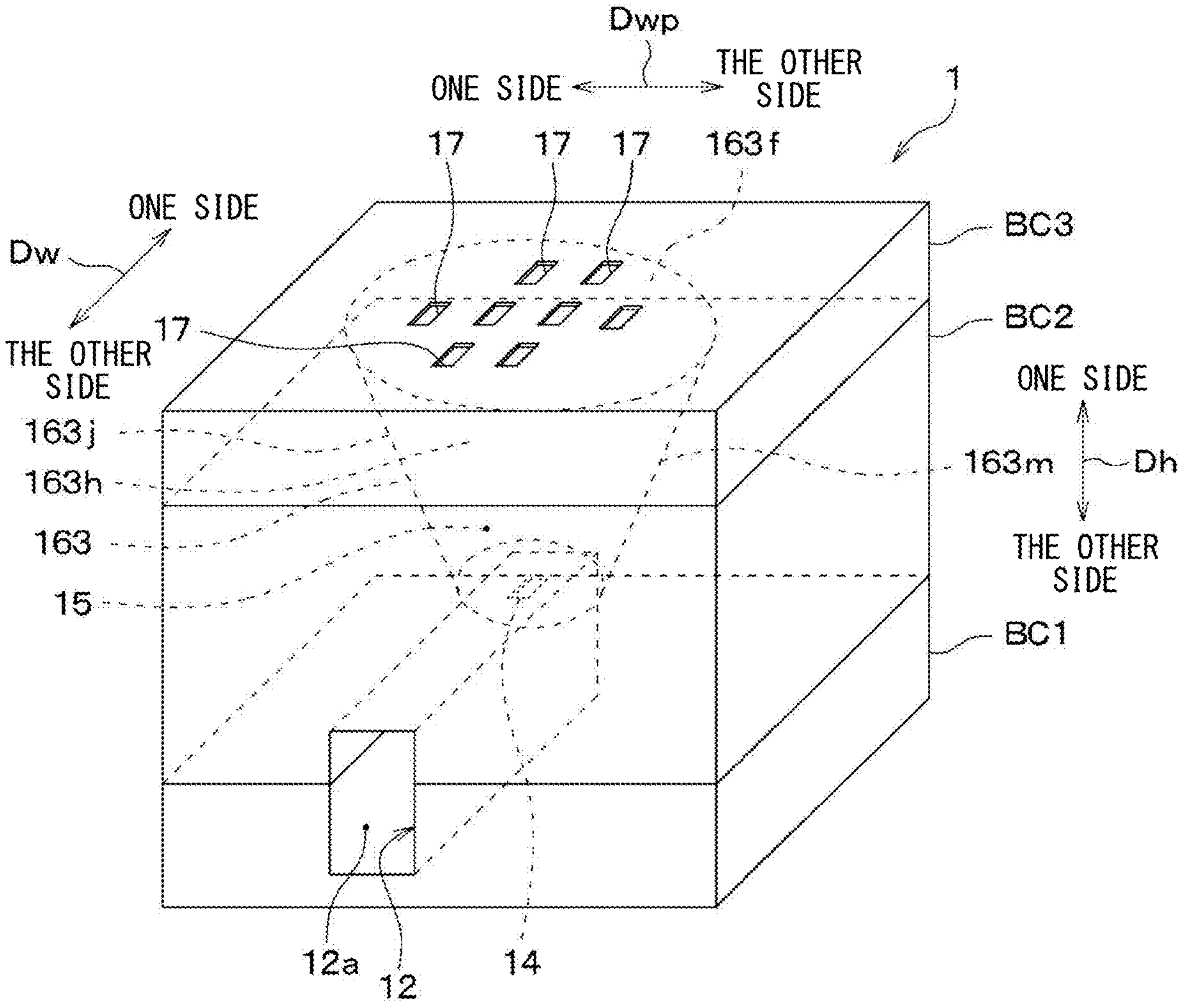
FIG. 20 is a schematic perspective view of an antenna device according to a fourth embodiment, showing an image of a shape of a cavity.

As shown in FIG. 20, this embodiment is different from the third embodiment in the arrangement of the radiation apertures 17. A maximum of three radiation apertures 17 in this embodiment are lined in the width direction Dw, and a maximum of four radiation apertures 17 are lined in the lateral direction Dwp.

Further, in a cross section parallel to the width direction Dw and the lateral direction Dwp, the side wall 163 of this embodiment has an annular shape or an elliptical shape. The side wall 163 is formed so as to increase in diameter toward one side in the height direction Dh. Therefore, all of the inclined wall surface 163*f*, 163*h*, 163*j*, 163*m* of the side wall 163 are curved concavely in a plan view, and are continuously connected to each other without bending.

Aside from the above-described aspects, the present embodiment is the same as the third embodiment. Thus, this embodiment can achieve the advantages obtained by the configuration common to the third embodiment in a similar manner as in the third embodiment.

This embodiment is a modification based on the third embodiment, but it is possible to combine this embodiment with the first embodiment or the second embodiment.

Fifth Embodiment

A fifth embodiment is described next. This embodiment is explained mainly with respect to points different from those of the first embodiment.

Figure 21:
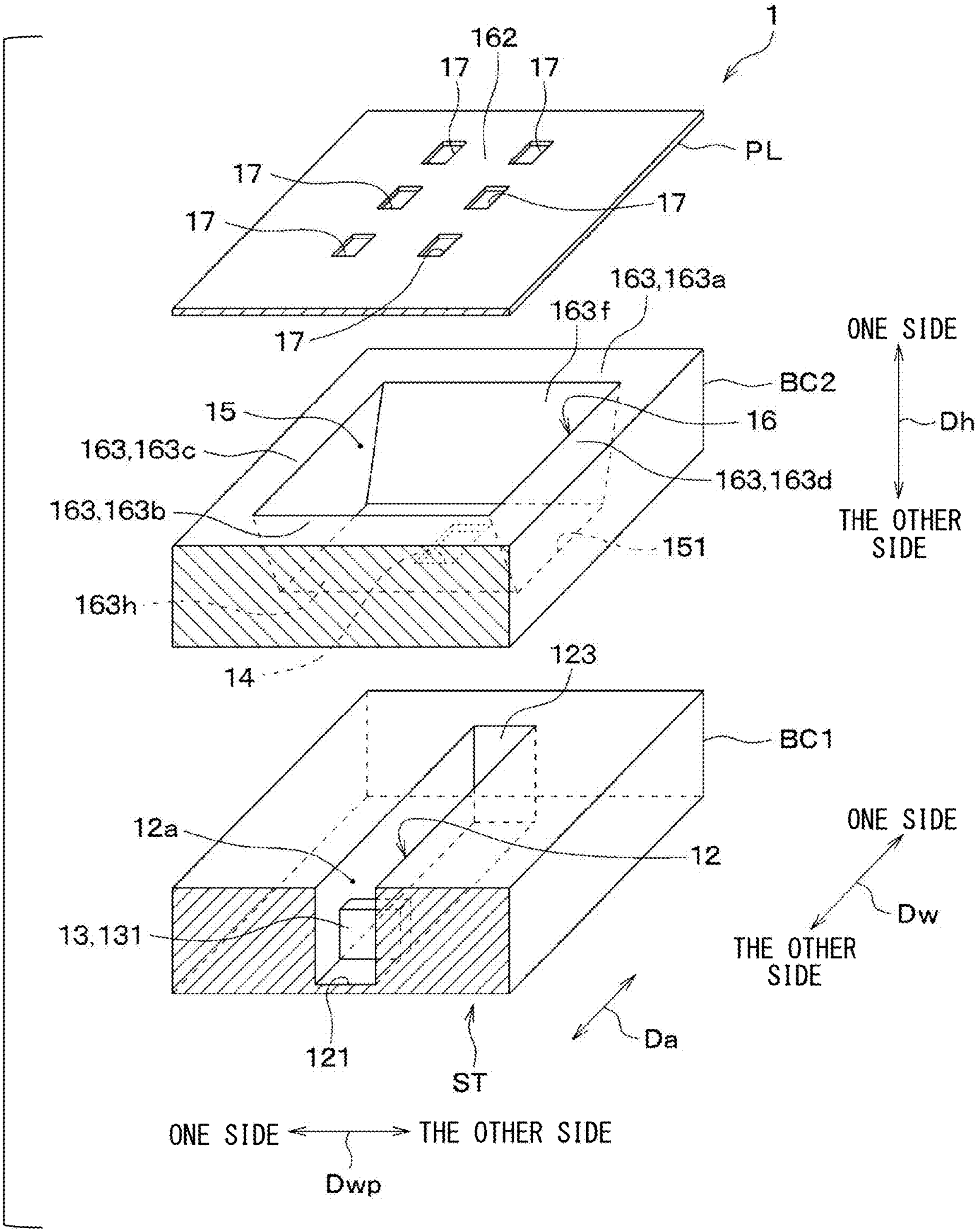
FIG. 21 is a schematic exploded perspective view showing an antenna device of a fifth embodiment, corresponding to FIG. 5.

As shown in FIG. 21, the antenna device 1 of this embodiment does not include the third block BC3 of FIG. 5, but instead includes a plate PL. That is, the antenna device 1 is a stacked structure ST in which two conductive blocks BC1 and BC2 and the conductive plate PL are stacked.

The two blocks BC1 and BC2 are made of metal blocks. The plate PL is composed of a metal plate. At least one of the two blocks BC1, BC2 and the plate PL is, for example, a resin member on which a conductive film such as a metal film is formed by plating or the like, or is made of a conductive member formed of a conductive material other than metal.

In the antenna device 1, the two blocks BC1, BC2 and the plate PL are coupled to each other by screwing, adhesive, or the like.

The two blocks BC1, BC2 and the plate PL have the same rectangular shape in the plan view. Further, the two blocks BC1, BC2 and the plate PL have approximately the same size in the plan view so as to overlap each other in the height direction Dh. The two blocks BC1, BC2 and the plate PL are electrically connected by being stacked on each other.

The waveguide section 12 of this embodiment is formed by a first groove portion 121 of the first block BC1 and a flat portion of the second block BC2 facing the first groove portion 121. The second block BC2 of this embodiment is not provided with the second groove portion 122 described in the first embodiment.

The reflection suppressing wall 13 includes a first protruding wall 131 that protrudes from the bottom surface of the first groove portion 121 toward one side in the height direction Dh. In this embodiment, the second protruding wall 132 described in the first embodiment is not provided.

The cavity 15 of this embodiment is formed by coupling a first recess 151 of the second block BC2 onto the plate PL that faces the first recess 151. In this embodiment, the second block BC2 and a part of the plate PL that forms the cavity 15 constitutes the cavity section 16. The power supply opening 14 is provided in the bottom surface of the first recess 151 of the second block BC2 at position facing the first groove portion 121.

Further, in this embodiment, as in the first modification of the first embodiment, the vertical wall surface 163*e*, 163*g* (see FIG. 3) of the cavity section 16 is not provided, and the inclined wall surface 163*f*, 163*h* extends over the entire width of the cavity 15 in the height direction Dh.

This embodiment is similar to the first embodiment, except for the above-described aspects. Thus, this embodiment can achieve the advantages obtained by the configuration common to the first embodiment in a similar manner as in the first embodiment.

Though the present embodiment is a modification based on the first embodiment, the present embodiment can also be combined with the second to fourth embodiments.

Sixth Embodiment

A sixth embodiment is described next. This embodiment is explained mainly with respect to points different from those of the first embodiment.

Figure 22:
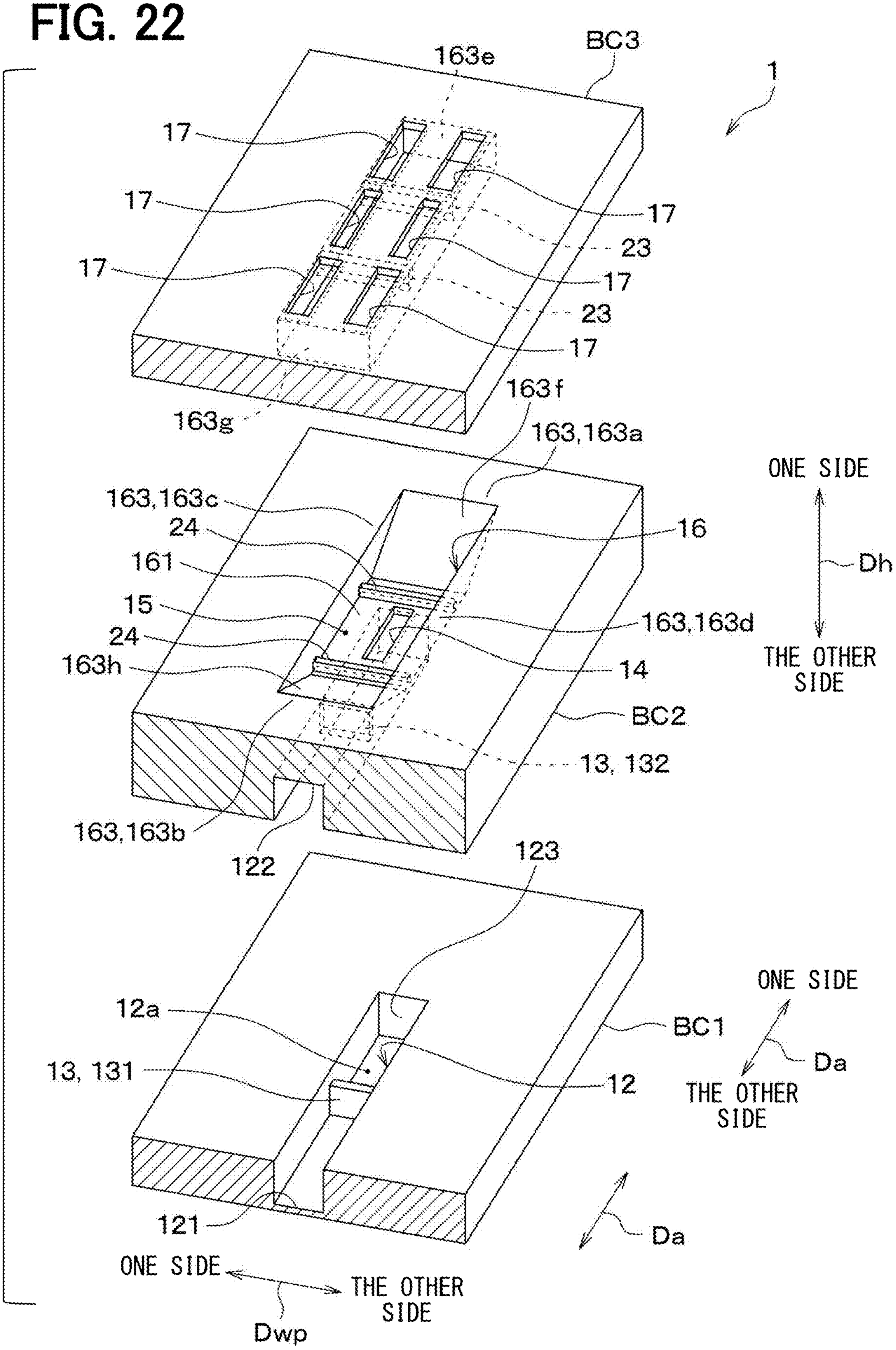
FIG. 22 is a schematic exploded perspective view showing an antenna device of a sixth embodiment, corresponding to FIG. 5.
Figure 23:
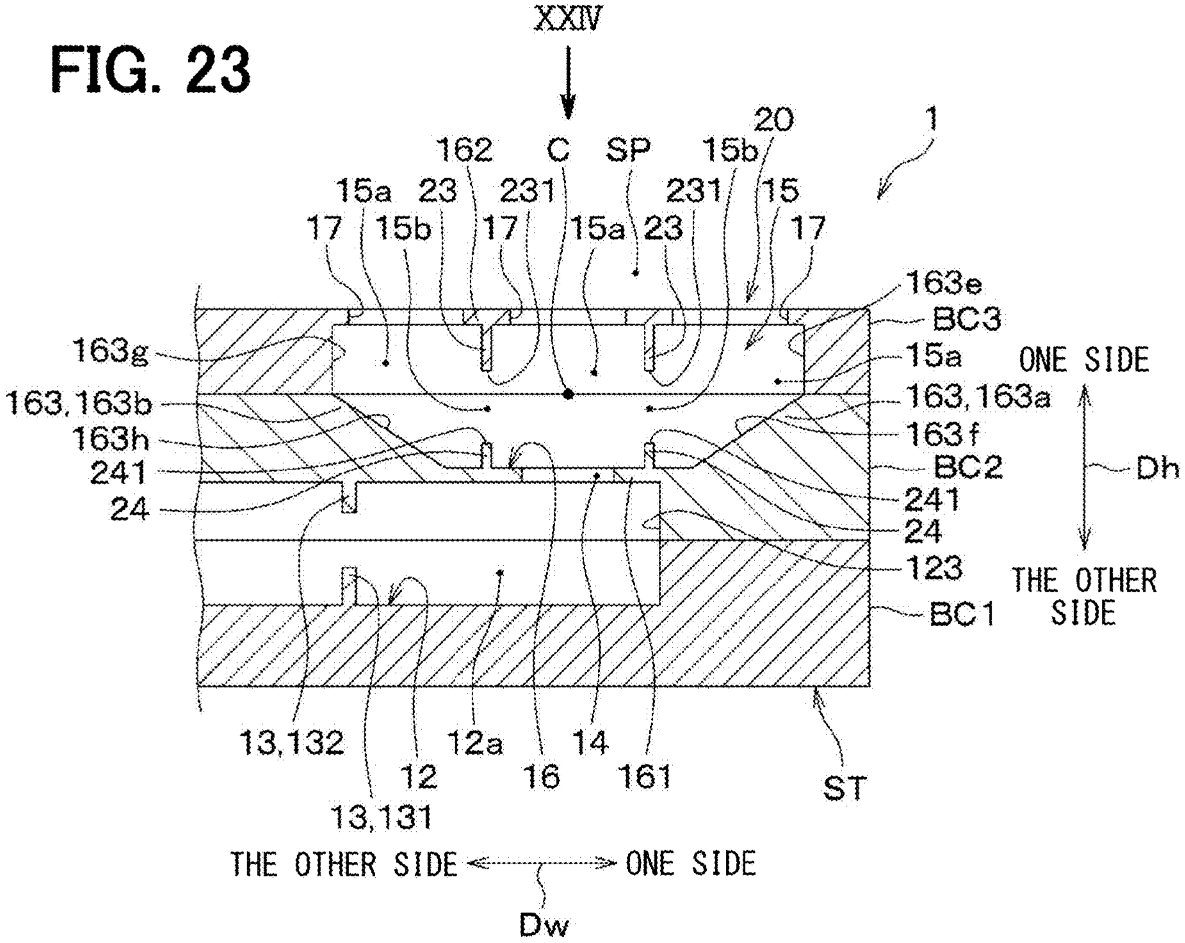
FIG. 23 is a schematic cross-sectional view showing the antenna device of the sixth embodiment, corresponding to FIG. 3.
Figure 24:
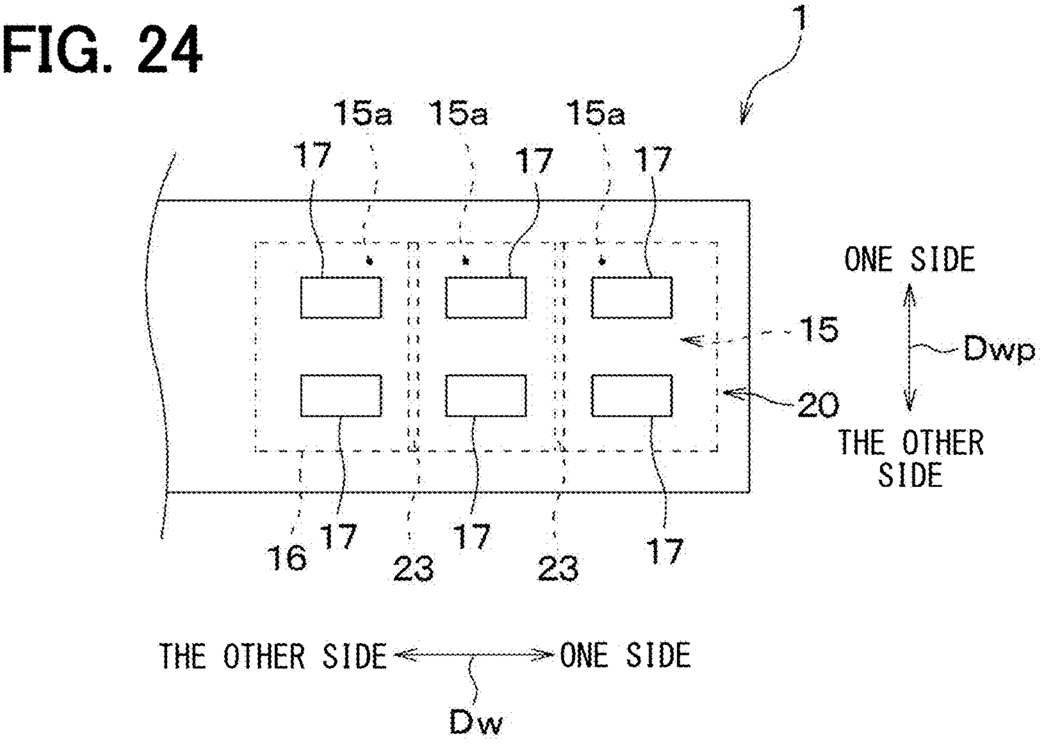
FIG. 24 is a plan view, corresponding to FIG. 6, which is viewed in an arrow direction XXIV of FIG. 23 in the sixth embodiment.

As shown in FIGS. 22 to 24, the antenna device 1 of the present embodiment includes plural first partition walls 23 provided in the third block BC3 and plural second partition walls 24 provided in the second block BC2. The first partition walls 23 correspond to a second-direction partition wall of the present disclosure.

The first partition walls 23 and the second partition walls 24 are arranged within the cavity 15. As shown in FIGS. 23 and 24, the first partition wall 23 is provided at each position between the radiation apertures 17 adjacent to each other in the width direction Dw in the plan view. Each of the first partition walls 23 is formed to protrude into the cavity 15 from the second wall 162 of the cavity section 16, and is provided over the entire width of the cavity 15 in the lateral direction Dwp. Each of the first partition walls 23 has a tip 231 on the other side in the height direction Dh.

The second partition walls 24 are formed and arranged so as to face the first partition walls 23 respectively in the height direction Dh within the cavity 15. Specifically, the second partition wall 24 is provided at each position between the radiation apertures 17 adjacent to each other in the width direction Dw in the plan view. In short, the second partition walls 24 are provided at the same position as the first partition walls 23 in the plan view. The second partition wall 24 is formed to protrude into the cavity 15 from the first wall 161 of the cavity section 16, over the entire width of the cavity 15 in the lateral direction Dwp. Each of the second partition walls 24 has a tip 241 on one side in the height direction Dh.

Plural compartment spaces 15*a* are formed in the cavity 15 and arranged in the width direction Dw with the first partition walls 23 and the second partition walls 24 in between, by providing the first partition walls 23 and the second partition walls 24. The first partition walls 23 and the second partition walls 24 are formed symmetrically between the one side and the other side in the width direction Dw as well as in the lateral direction Dwp, similarly to the cavity integration portion 20.

Further, the tip 231 of the first partition wall 23 and the tip 241 of the second partition wall 24 are separated from each other in the height direction Dh. Therefore, a communication portion 15*b* is also formed in the cavity 15, to connect the adjacent compartment spaces 15*a* arranged in the height direction Dh with the first partition wall 23 and the second partition wall 24 interposed therebetween. The communication portion 15*b* is formed on the other side of the cavity 15 in the height direction Dh with respect to the tip 231 of the first partition wall 23 and on one side in the height direction Dh with respect to the tip 241 of the second partition wall 24. In short, the communication portion 15*b* is formed between the tip 231 of the first partition wall 23 and the tip 241 of the second partition wall 24 in the height direction Dh.

Further, the height of the second partition wall 24 protruding into the cavity 15 is lower than the height of the first partition wall 23 protruding into the cavity 15. For example, the protruding height of the second partition wall 24 is half the depth of the first recess 151 or less. Therefore, the communication portions 15*b* are arranged biased toward the other side in the height direction Dh within the cavity 15.

(1) According to the present embodiment, the first partition wall 23 protruding from the second wall 162 into the cavity 15 is provided for each position between the radiation apertures 17 adjacent to each other in the width direction Dw. The communication portion 15*b* of the cavity 15 connecting the adjacent compartment spaces 15*a* adjacent to each other with the first partition wall 23 in between is formed on the other side of the cavity 15 in the height direction Dh with respect to the tip 231 of the first partition wall 23.

Thereby, isolation in the width direction Dw can be ensured between the radiation apertures 17 by the first partition wall 23. Accordingly, it is possible to improve the accuracy of phase alignment of radio waves among the radiation apertures 17.

(2) Furthermore, according to the present embodiment, each of the communication portions 15*b* is arranged biased toward the other side in the height direction Dh within the cavity 15. This restricts the propagation of radio waves between each of the radiation apertures 17 and the power supply opening 14 from being excessively obstructed by the first partition wall 23, and makes it easier to ensure isolation between the radiation apertures 17 in the width direction Dw.

This embodiment is similar to the first embodiment, except for the above-described aspects. Thus, this embodiment can achieve the advantages obtained by the configuration common to the first embodiment described above in a similar manner as in the first embodiment.

Though the present embodiment is a modification based on the first embodiment, the present embodiment can also be combined with the second to fifth embodiments.

Seventh Embodiment

A seventh embodiment is described next. The present embodiment will be explained primarily with respect to portions different from those of the sixth embodiment.

Figure 25:
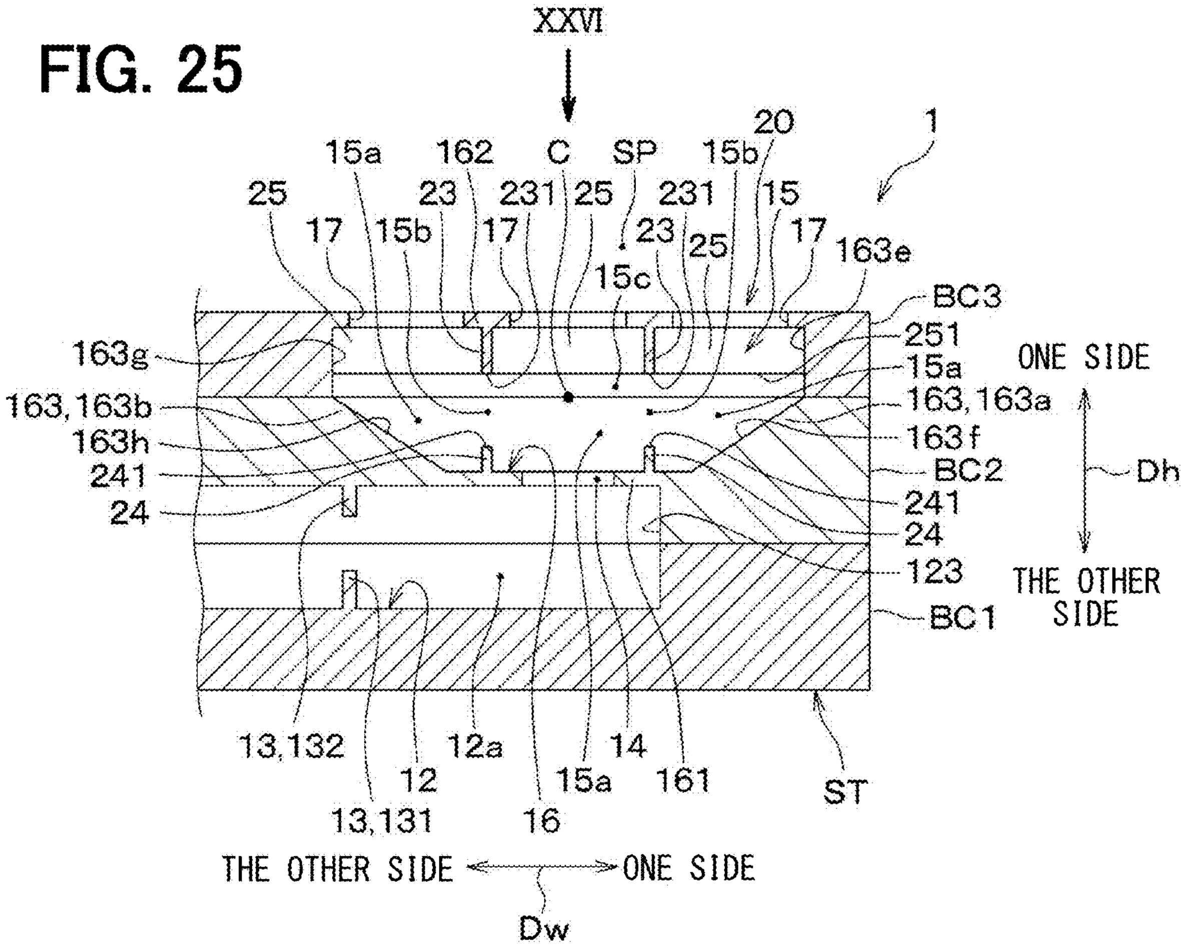
FIG. 25 is a schematic cross-sectional view showing an antenna device of a seventh embodiment, corresponding to FIG. 3.
Figure 26:
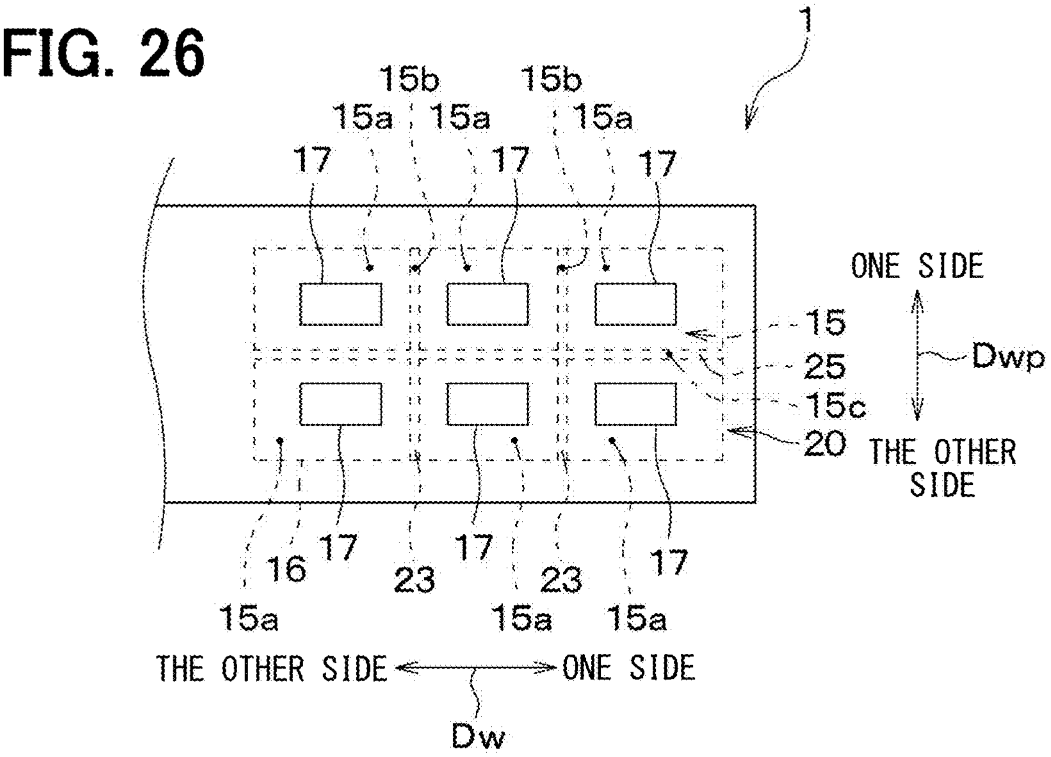
FIG. 26 is a plan view, corresponding to FIG. 6, which is viewed in an arrow direction XXVI of FIG. 25 in the seventh embodiment.

As shown in FIGS. 25 and 26, the antenna device 1 of this embodiment has a third partition wall 25 provided in the third block BC3 in addition to the first partition walls 23 and the second partition walls 24 as in the sixth embodiment. The first partition wall 23 of this embodiment correspond to a second-direction partition wall of the present disclosure, similarly to the sixth embodiment. Further, the third partition wall 25 of this embodiment corresponds to a third-direction partition wall of the present disclosure.

The third partition wall 25 is arranged within the cavity 15. The third partition wall 25 is provided at position between the radiation apertures 17 adjacent to each other in the lateral direction Dwp in the plan view. The third partition wall 25 is formed to protrude into the cavity 15 from the second wall 162 of the cavity section 16, and is provided over the entire width of the cavity 15 in the width direction Dw. The third partition wall 25 has a tip 251 on the other side in the height direction Dh.

Since the third partition wall 25 is formed to be perpendicular to the first partition walls 23, the third partition wall 25 and the first partition walls 23 are formed in a lattice shape as a whole. Further, in this embodiment, the compartment spaces 15*a* divided by the first to third partition walls 23, 24, and 25 are formed in the same number as the radiation apertures 17, and are provided in one-to-one correspondence with the radiation apertures 17. That is, three of the compartment spaces 15*a* are arranged in the width direction Dw and two of the compartment spaces 15*a* are arranged in the lateral direction Dwp, forming a 3×2 grid-like arrangement.

For example, the height of the third partition wall 25 protruding into the cavity 15 is the same as the height of the first partition wall 23 protruding into the cavity 15. That is, the position of the tip 251 of the third partition wall 25 in the height direction Dh is the same as the position of the tip 231 of the first partition wall 23.

Therefore, the communication portion 15*c* is also formed on the other side of the cavity 15 in the height direction Dh relative to the tip 251 of the third partition wall 25. The communication portion 15*c* is in contact with the tip 251 of the third partition wall 25, and connects the adjacent compartment spaces 15*a* with the third partition wall 25 in between. The communication portion 15*c* in contact with the tip 251 of the third partition wall 25 is also arranged biased toward the other side in the height direction Dh within the cavity 15, similarly to the communication portion 15*b* in contact with the tip 231 of the first partition wall 23.

Further, the first partition walls 23, the second partition walls 24, and the third partition wall 25 are formed symmetrically between the one side and the other side in the width direction Dw, as well as in the lateral direction Dwp, similarly to the cavity integration portion 20.

(1) According to the present embodiment, the third partition wall 25 protruding from the second wall 162 into the cavity 15 is located between the radiation apertures 17 adjacent to each other in the lateral direction Dwp. The communication portion 15*c* that connects the adjacent compartment spaces 15*a* of the cavity 15 with the third partition wall 25 in between is formed on the other side of the cavity 15 in the height direction Dh with respect to the tip 251 of the third partition wall 25.

As a result, isolation can be ensured by the third partition wall 25 between the radiation apertures 17 in the lateral direction Dwp. Accordingly, the accuracy of phase alignment of radio waves among the radiation apertures 17 can be improved. Isolation between the individual radiation apertures 17 can also be ensured by the first partition wall 23 and the third partition wall 25.

Aside from the above-described aspects, the present embodiment is the same as the sixth embodiment. Further, in the present embodiment, effects similar to those of the sixth embodiment described above can be obtained in the same manner as in the sixth embodiment.

Eighth Embodiment

An eighth embodiment is described next. This embodiment is explained mainly with respect to points different from those of the first embodiment.

Figure 27:
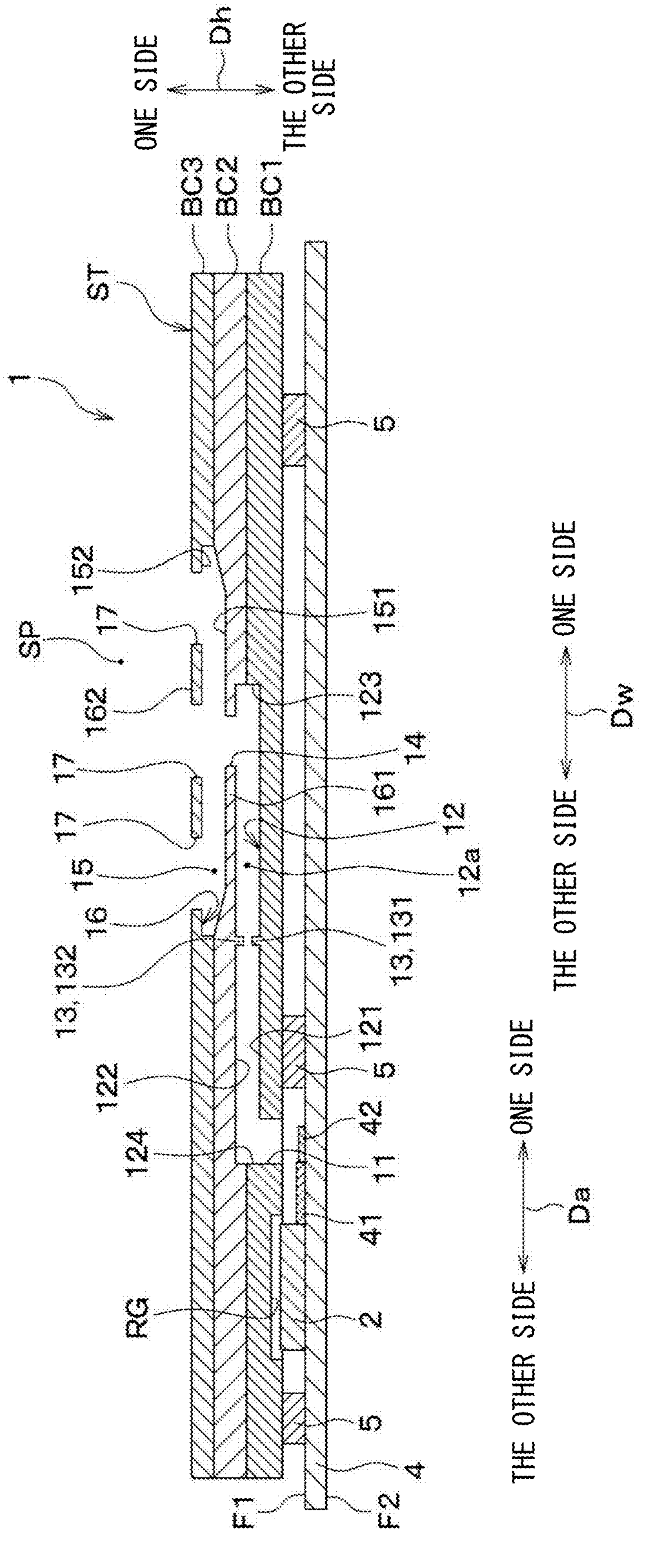
FIG. 27 is a schematic cross-sectional view showing an antenna device of an eighth embodiment, corresponding to FIG. 2.

As shown in FIG. 27, in this embodiment, a connection wiring 41 and an input/output circuit 42 are connected to the electric board 4 instead of the input/output section 3 (see FIG. 2) of the MMIC 2 described in the first embodiment.

The connection wiring 41 and the input/output circuit 42 are constituted by a conductive wiring pattern formed on one surface F1 of the electric board 4.

The connection wiring 41 is formed so as to be led out from the MMIC 2 along one surface F1 of the electric board 4. The connection wiring 41 has one end electrically connected to the terminal of the MMIC 2 and the other end electrically connected to the input/output circuit 42.

The input/output circuit 42 transmits and receives radio waves to and from the external port 11 of the antenna device 1. The input/output circuit 42 functions similarly to the input/output section 3 of the MMIC 2 described in the first embodiment.

The external port 11 of this embodiment is arranged to face the input/output circuit 42. This allows radio waves to propagate between the external port 11 and the input/output circuit 42. In this embodiment, since the antenna device 1 is arranged closer to the electric board 4 in the height direction Dh than in the first embodiment, the first block BC1 has a groove portion RG recessed to the one side in the height direction Dh. The MMIC 2 is partially inserted into the groove portion RG.

Aside from the above-described aspects, the present embodiment is the same as the first embodiment. Thus, this embodiment can achieve the advantages obtained by the configuration common to the first embodiment described above in a similar manner as in the first embodiment.

Though the present embodiment is a modification based on the first embodiment, the present embodiment can also be combined with the second to seventh embodiments.

Ninth Embodiment

A ninth embodiment is described next. The present embodiment will be explained primarily with respect to portions different from those of the eighth embodiment.

Figure 28:
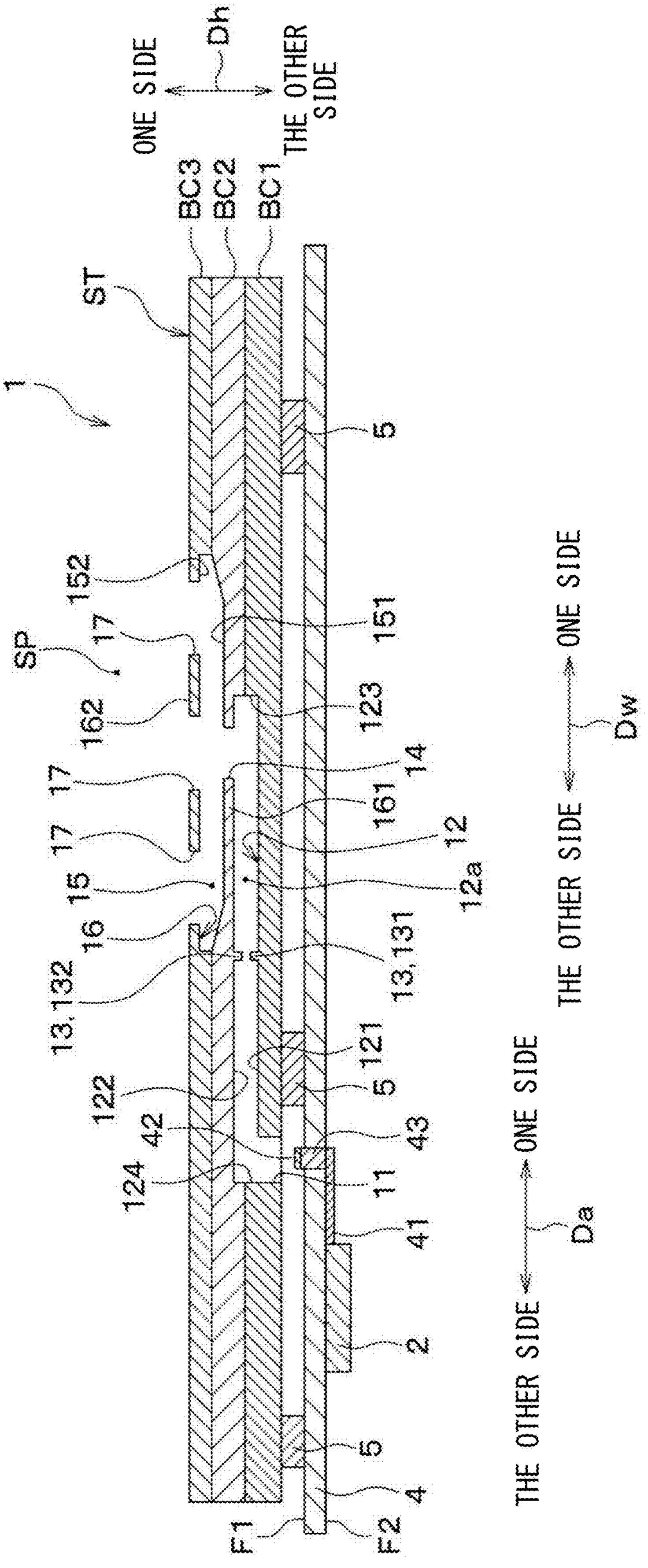
FIG. 28 is a schematic cross-sectional view showing an antenna device of a ninth embodiment, corresponding to FIG. 2.

As shown in FIG. 28, the MMIC 2 is mounted not on one surface F1 of the electric board 4 but on the other surface F2 of the electric board 4. The first block BC1 does not have the groove portion RG described in the eighth embodiment.

Further, in the electric board 4, an input/output circuit 42 is formed on one surface F1, and a connection wiring 41 is formed on the other surface F2. The electric board 4 is provided with a connector 43 that penetrates the electric board 4 and electrically connects the connection wiring 41 and the input/output circuit 42. The connector 43 is configured by, for example, a through hole. The input/output circuit 42 and the connection wiring 41 are electrically connected via the connector 43.

Aside from the above-described aspects, the present embodiment is the same as the eighth embodiment. Further, in the present embodiment, effects similar to those of the eighth embodiment described above can be obtained in the same manner as in the eighth embodiment.

Tenth Embodiment

A tenth embodiment is described next. This embodiment is explained mainly with respect to points different from those of the first embodiment.

Figure 29:
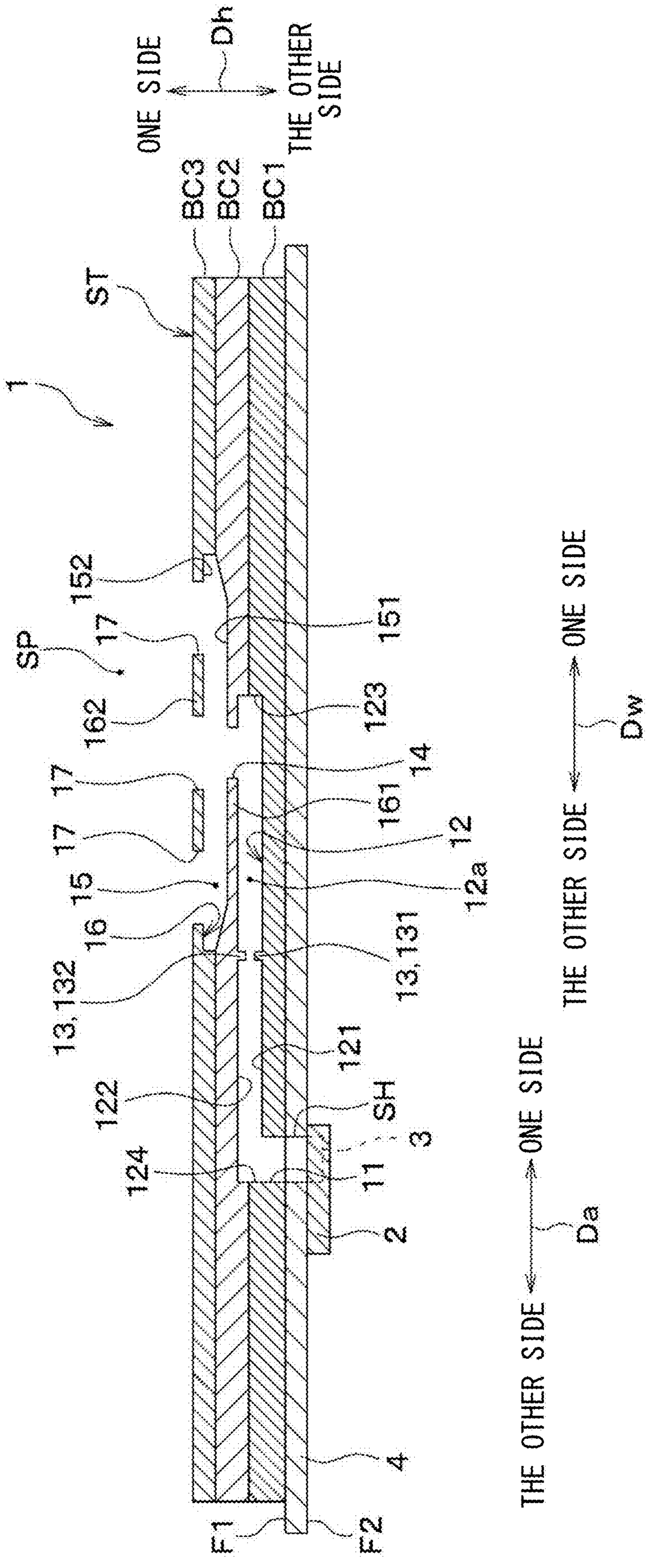
FIG. 29 is a schematic cross-sectional view showing an antenna device of a tenth embodiment, corresponding to FIG. 2.

As shown in FIG. 29, in this embodiment, the spacer 5 (see FIG. 2) described in the first embodiment is not provided. The antenna device 1 of this embodiment is arranged such that the first block BC1 contacts one surface F1 of the electric board 4 without interposing the spacer 5 therebetween. The MMIC 2 is mounted on the other surface F2 of the electric board 4.

Further, a through hole SH penetrating the electric board 4 in the height direction Dh is formed at a position of the electric board 4 facing the input/output section 3 of the MMIC 2. The external port 11 is disposed to face the input/output section 3 of the MMIC 2 with the through hole SH interposed therebetween. This arrangement allows radio waves to propagate between the external port 11 and the MMIC 2.

This embodiment is similar to the first embodiment, except for the above-described aspects. Thus, this embodiment can achieve the advantages obtained by the configuration common to the first embodiment described above in a similar manner as in the first embodiment.

Though the present embodiment is a modification based on the first embodiment, the present embodiment can also be combined with the second to seventh embodiments.

Eleventh Embodiment

An eleventh embodiment is described next. The present embodiment will be explained primarily with respect to portions different from those of the ninth embodiment.

Figure 30:
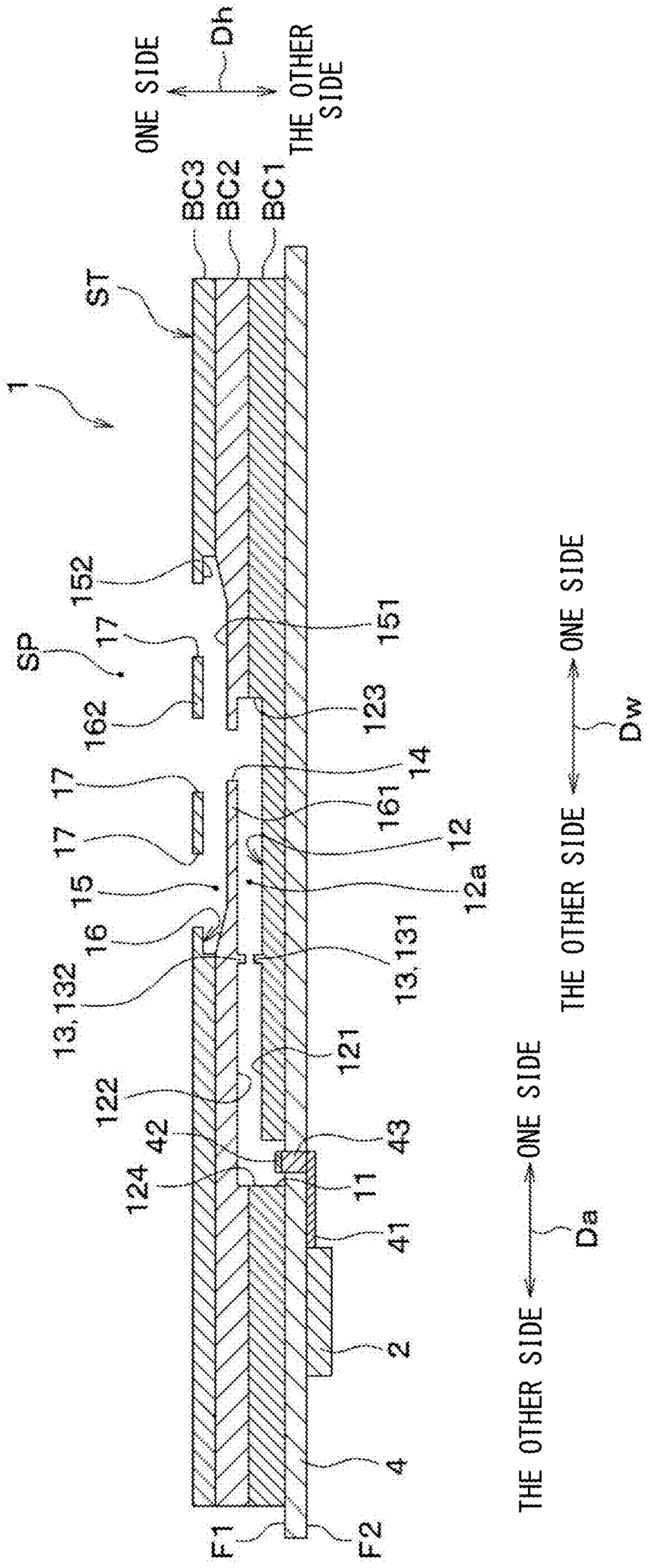
FIG. 30 is a schematic cross-sectional view showing an antenna device of an eleventh embodiment, corresponding to FIG. 2.

As shown in FIG. 30, in this embodiment, the spacer 5 (see FIG. 28) described in the first embodiment is not provided. The antenna device 1 of this embodiment is arranged such that the first block BC1 contacts one surface F1 of the electric board 4 without interposing the spacer 5 therebetween. The MMIC 2 is mounted on the other surface F2 of the electric board 4.

Further, an input/output circuit 42 is formed on one surface F1 of the electric board 4, and a connection wiring 41 is formed on the other surface F2 of the electric board 4. The electric board 4 is provided with a connector 43 that penetrates the electric board 4 and electrically connects the connection wiring 41 and the input/output circuit 42. The connector 43 is configured by, for example, a through hole. The input/output circuit 42 and the connection wiring 41 are electrically connected via the connector 43.

Aside from the above-described aspects, the present embodiment is the same as the ninth embodiment. Further, in the present embodiment, effects similar to those of the ninth embodiment described above can be obtained in the same manner as in the ninth embodiment.

Twelfth Embodiment

A twelfth embodiment is described next. This embodiment is explained mainly with respect to points different from those of the first embodiment.

Figure 31:
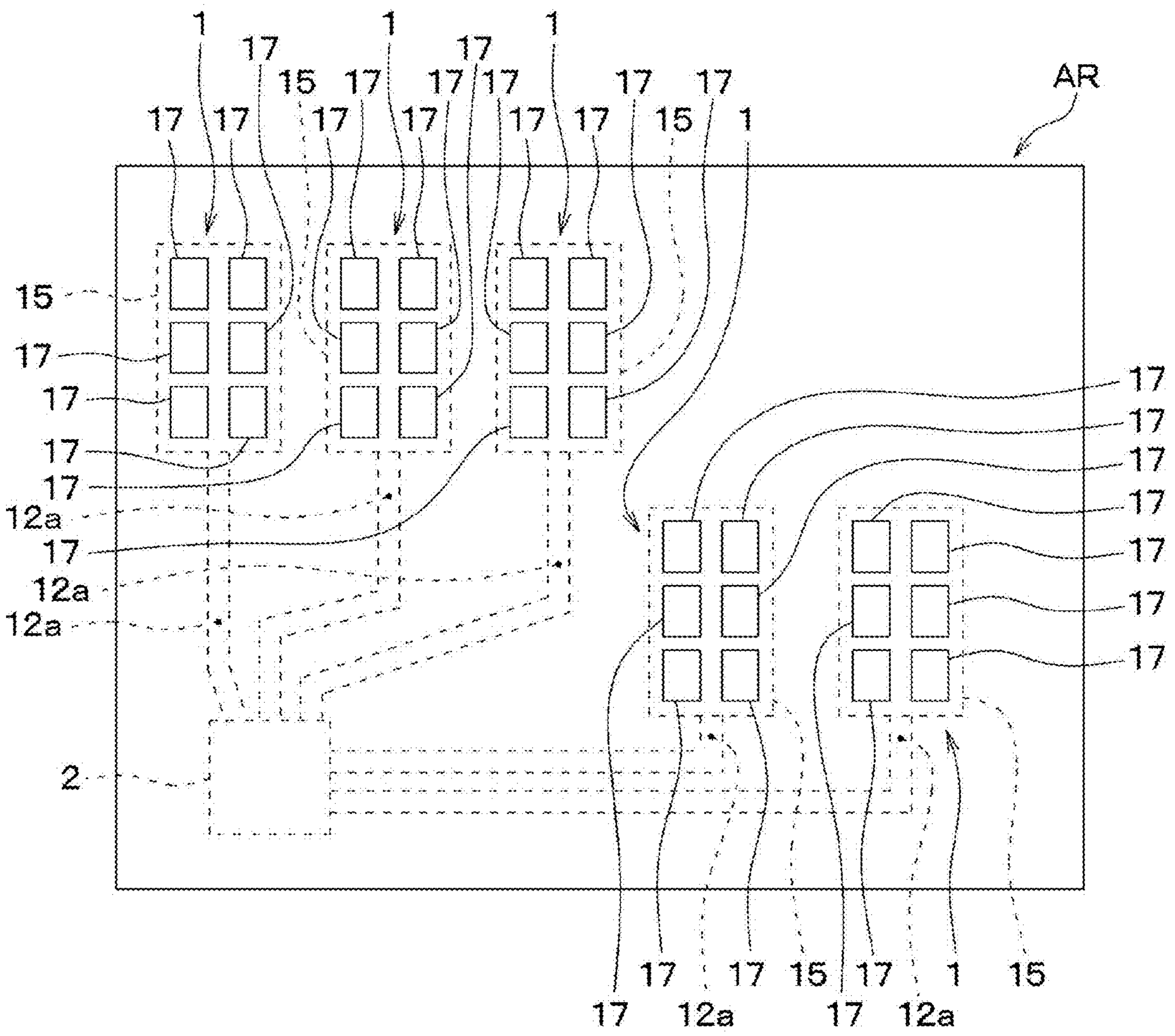
FIG. 31 is a schematic plan view showing an equipment including an antenna device of a twelfth embodiment.

As shown in FIG. 31, by using an array antenna AR in which plural antenna devices 1 are arrayed, a configuration can be established for transmitting radio waves transmitted and received by the MMIC 2. Such an array antenna AR can, for example, collect the MMIC 2 of the waveguide paths 12*a* of the antenna devices 1, so as to propagate radio waves between each of the waveguide paths 12*a* and the MMIC 2.

As described in the above embodiment, the antenna device 1 can be configured in a small size. Therefore, by configuring an array antenna AR using the plural antenna devices 1, a small array antenna AR can be created. In addition, since the input/output section 3 of the MMIC 2 can be connected to a large number of radiation apertures 17, it is possible to increase the gain of the array antenna AR.

This embodiment is similar to the first embodiment, except for the above-described aspects. Thus, this embodiment can achieve the advantages obtained by the configuration common to the first embodiment described above in a similar manner as in the first embodiment.

Though the present embodiment is a modification based on the first embodiment, the present embodiment can also be combined with the second to eleventh embodiments.

Other Embodiments (1) In each of the embodiments, as shown in FIG. 1, the waveguide extending direction Da of the waveguide path 12*a* coincides with the width direction Dw, but the waveguide extending direction Da is not limited to this and may be somewhat inclined with respect to the width direction Dw.

(2) In the first embodiment, as shown in FIGS. 3 and 6, three radiation apertures 17 are arranged in the width direction Dw, but four or more radiation apertures 17 may be arranged in the width direction Dw.

The same thing can be said about the second and third embodiments. That is, in the second embodiment, as shown in FIG. 13, three radiation apertures 17 are arranged in the lateral direction Dwp, but four or more radiation apertures 17 may be arranged in the lateral direction Dwp. Further, in the third embodiment, as shown in FIG. 19, three radiation apertures 17 are arranged in each of the width direction Dw and the lateral direction Dwp, but four or more radiation apertures 17 may be arranged in each of the width direction Dw and the lateral direction Dwp.

(3) In the first embodiment, as shown in FIGS. 3 and 5, the inclined wall surface 163*f*, 163*h* is configured as flat surface, but this is just an example. For example, the inclined wall surface 163*f*, 163*h* may be formed by curved surface curved in the cross section shown in FIG. 3.

Similarly, in the second embodiment, as shown in FIG. 15, the inclined wall surface 163*j*, 163*m* is configured as flat surface, but this is just an example. For example, the inclined wall surface 163*j*, 163*m* may be configured with curved surface curved in the cross section shown in FIG. 15.

(4) In each of the embodiments, as shown in FIG. 3, the waveguide section 12 has the reflection suppressing wall 13, which is desirable, but the reflection suppressing wall 13 may not be an essential configuration. For example, the antenna device 1 may have a configuration in which the reflection suppressing wall 13 is omitted, or a configuration in which only one of the protruding walls 131 and 132 of the reflection suppressing wall 13 is omitted. Furthermore, the protruding walls 131 and 132 may have the same shape or different shapes.

Furthermore, the reflection suppressing wall 13 is not limited to be formed locally narrow the waveguide path 12*a* in the height direction Dh, but may be formed locally narrow the waveguide path 12*a* in the lateral direction Dwp.

(5) In the sixth and seventh embodiments, as shown in FIG. 23, the second partition walls 24 are provided, but the second partition walls 24 may not be provided.

(6) In the seventh embodiment, as shown in FIG. 26, two of the radiation apertures 17 are arranged in the lateral direction Dwp, but three or more radiation apertures 17 may be arranged as shown in FIG. 19. In such a case, plural third partition walls 25 are provided. The third partition wall 25 is provided for each position between the radiation apertures 17 adjacent to each other in the lateral direction Dwp in the plan view.

(7) In the seventh embodiment, in addition to the third partition wall 25, the first partition walls 23 and the second partition walls 24 are provided. However, the first partition walls 23 and the second partition walls 24 may not be provided.

(8) In each of the embodiments, the cavity integration portion 20 is formed symmetrically between the one side and the other side in the width direction Dw and symmetrically between the one side and the other side in the lateral direction Dwp, and it is desirable to form it in this way, but is not limited to this.

(9) In the first embodiment and the like, the waveguide path 12*a* extends linearly, but the waveguide path 12*a* may extend with a part curved. In such a waveguide path 12*a*, the waveguide extending direction Da is defined as the tangential direction of the central axis of the waveguide path 12*a*.

(10) The antenna device 1 is not limited to the structure ST in which three blocks BC1, BC2, and BC3 are stacked in the height direction Dh.

(11) Although the MMIC 2 transmits and receives radio waves, this is just an example. The MMIC 2 may perform only one of transmitting and receiving radio waves. The antenna device 1 is also applicable to an equipment that transmits and receives radio waves using semiconductor devices other than the MMIC 2.

(12) A round corner R may be formed or not formed in each space of the antenna device 1 of the embodiment, such as the external port 11, the waveguide path 12*a*, the power supply opening 14, the cavity 15, the radiation apertures 17 and the like. The characteristics of the antenna device 1 are not substantially affected by the round corner R.

(13) The present disclosure is not limited to the embodiment described above, and can be variously modified. In addition, the embodiments described above are not unrelated to each other, and can be appropriately combined unless the combination is obviously impossible.

Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

What is claimed is:

1. An antenna device comprising:

a waveguide section forming a waveguide path to propagate radio waves; and a cavity section forming a cavity to communicate with the waveguide path via a power supply opening located on one side of the waveguide section in a first direction, wherein the cavity section includes a first wall having the power supply opening and facing the cavity from the other side opposite to the one side in the first direction, a second wall opposing the first wall and having a plurality of radiation apertures, the second wall facing the cavity from the one side in the first direction, and a side wall that connects the first wall and the second wall to surround the cavity between the first wall and the second wall, the plurality of radiation apertures communicate the cavity and an external space to propagate the radio waves between the cavity and the external space, the plurality of radiation apertures having at least three apertures arranged in a second direction perpendicular to the first direction, in a first cross section along the first direction and the second direction, the side wall has a second-direction changing surface on one side and the other side of the power supply opening in the second direction to face the cavity such that a distance from the power supply opening in the second direction increases toward the one side in the first direction, the second-direction changing surface is shaped so that variations in phase of the radio waves at the plurality of radiation apertures are reduced when the radio waves of a predetermined wavelength are propagated from the power supply opening to the cavity, in comparison with a case where the second-direction changing surface is not provided in the first cross section such that the distance from the power supply opening to the side wall in the second direction is constant, the antenna device further comprises a plurality of second-direction partition walls protruding into the cavity from the second wall and located at positions between the radiation apertures adjacent to each other in the second direction, each of the plurality of second-direction partition walls has a tip on the other side in the first direction, the cavity has compartment spaces partitioned by the second-direction partition walls, the cavity has a communication portion that connects the compartment spaces adjacent to each other, and the communication portion is located on the other side of the tip of the second-direction partition wall in the first direction.

2. The antenna device according to claim 1, wherein the plurality of radiation apertures includes at least three apertures arranged in a third direction perpendicular to both the first direction and the second direction, in a second cross section along the first direction and the third direction, the side wall has a third-direction changing surface on one side and the other side of the power supply opening in the third direction to face the cavity such that a distance from the power supply opening in the third direction increases toward the one side in the first direction, and the third-direction changing surface is shaped so that variations in phase of the radio waves at the plurality of radiation apertures are reduced when the radio waves of a predetermined wavelength are propagated from the power supply opening to the cavity, in comparison with a case where the third-direction changing surface is not provided in the second cross section such that the distance from the power supply opening to the side wall in the third direction is constant.

3. The antenna device according to claim 1, wherein the power supply opening is located to overlap a center position of the cavity on the other side in the first direction.

4. The antenna device according to claim 1, wherein the cavity, the power supply opening, and the plurality of radiation apertures constitute a cavity integration portion, and the cavity integration portion is formed symmetrically in the second direction, and symmetrically in a third direction perpendicular to both the first direction and the second direction.

5. The antenna device according to claim 1, wherein the waveguide section extends in a waveguide extending direction, and the waveguide section includes a short wall located on one side in the waveguide extending direction with respect to an open position of the power supply opening that opens to the waveguide section so as to form an end of the waveguide section, and a reflection suppressing wall located on the other side of the open position in the waveguide extending direction so as to suppress reflection of the radio waves.

6. An antenna device comprising:

a waveguide section forming a waveguide path to propagate radio waves; and a cavity section forming a cavity to communicate with the waveguide path via a power supply opening located on one side of the waveguide section in a first direction, wherein the cavity section includes a first wall having the power supply opening and facing the cavity from the other side opposite to the one side in the first direction, a second wall opposing the first wall and having a plurality of radiation apertures, the second wall facing the cavity from the one side in the first direction, and a side wall that connects the first wall and the second wall to surround the cavity between the first wall and the second wall, the plurality of radiation apertures communicate the cavity and an external space to propagate the radio waves between the cavity and the external space, the plurality of radiation apertures having at least three apertures arranged in a second direction perpendicular to the first direction, in a first cross section along the first direction and the second direction, the side wall has a second-direction changing surface on one side and the other side of the power supply opening in the second direction to face the cavity such that a distance from the power supply opening in the second direction increases toward the one side in the first direction, the second-direction changing surface is shaped so that variations in phase of the radio waves at the plurality of radiation apertures are reduced when the radio waves of a predetermined wavelength are propagated from the power supply opening to the cavity, in comparison with a case where the second-direction changing surface is not provided in the first cross section such that the distance from the power supply opening to the side wall in the second direction is constant, the plurality of radiation apertures includes at least two apertures arranged in a third direction perpendicular to both the first direction and the second direction, the antenna device further comprising at least one third-direction partition wall protruding from the second wall into the cavity at position between the radiation apertures adjacent to each other in the third direction, the third-direction partition wall has a tip on the other side in the first direction, the cavity has compartment spaces partitioned by the third-direction partition wall, the cavity has a communication portion that connects the compartment spaces adjacent to each other, and the communication portion is located on the other side of the tip of the third-direction partition wall in the first direction.

7. The antenna device according to claim 1, wherein the communication portion is positioned to be biased toward the other side in the first direction within the cavity.

* * * * *